US008537933B2

(12) United States Patent
Ikeda et al.

(10) Patent No.: US 8,537,933 B2
(45) Date of Patent: Sep. 17, 2013

(54) RECEIVING DEVICE, RECEIVING METHOD, AND PROGRAM

(75) Inventors: Tamotsu Ikeda, Tokyo (JP); Satoshi Okada, Tokyo (JP); Ryuichiro Shimura, Kanagawa (JP); Takuya Okamoto, Chiba (JP)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 13/012,170

(22) Filed: Jan. 24, 2011

(65) Prior Publication Data
US 2011/0200146 A1  Aug. 18, 2011

(30) Foreign Application Priority Data
Feb. 17, 2010  (JP) ................ 2010-032126

(51) Int. Cl.
*H04L 27/00* (2006.01)

(52) U.S. Cl.
USPC ........... 375/316; 375/334; 375/345; 375/346; 375/354; 375/260

(58) Field of Classification Search
CPC ......... H04B 14/042; H04B 3/56; H04B 7/17; H04B 1/30; H04B 1/28; H04L 15/26; H04L 1/20; H04L 27/2647; H04N 5/4401
USPC ............... 375/316, 295, 216, 334, 345, 346, 375/354
See application file for complete search history.

(56) References Cited

U.S. PATENT DOCUMENTS

2007/0275682 A1* 11/2007 Adachi .................... 455/185.1

OTHER PUBLICATIONS

ARIB STD—B31 Version 1.6, Transmission System for Digital Terrestrial Television Broadcasting, Nov. 30, 2005.*
ARIB STD—B31 Version 1.8, Transmission System for Digital Terrestrial Television Broadcasting, Dec. 16, 2009, cover page, pp. 64-67.*
U.S. Appl. No. 13/100,379, filed May 4, 2011, Okamoto, et al.
Association of Radio Industries and Businesses, "Transmission System for Digital Terrestrial Television Broadcasting", ARIB STD—B31 Version 1.6-E2, Nov. 30, 2005, 172 pages.
U.S. Appl. No. 13/403,239, filed Feb. 23, 2012, Okamoto.

* cited by examiner

*Primary Examiner* — Kabir A Timory
*Assistant Examiner* — Ross Varndell
(74) *Attorney, Agent, or Firm* — Oblon, Spivak, McClelland, Maier & Neustadt, L.L.P.

(57) ABSTRACT

Disclosed herein is a receiving device, including a receiving section configured to receive only a partial segment among a plurality of segments obtained by dividing a frequency band of one physical channel when the receiving device is in a waiting state, and return from the waiting state to an activated state when warning information is transmitted, if transmission of the warning information by the partial segment is possible.

13 Claims, 19 Drawing Sheets

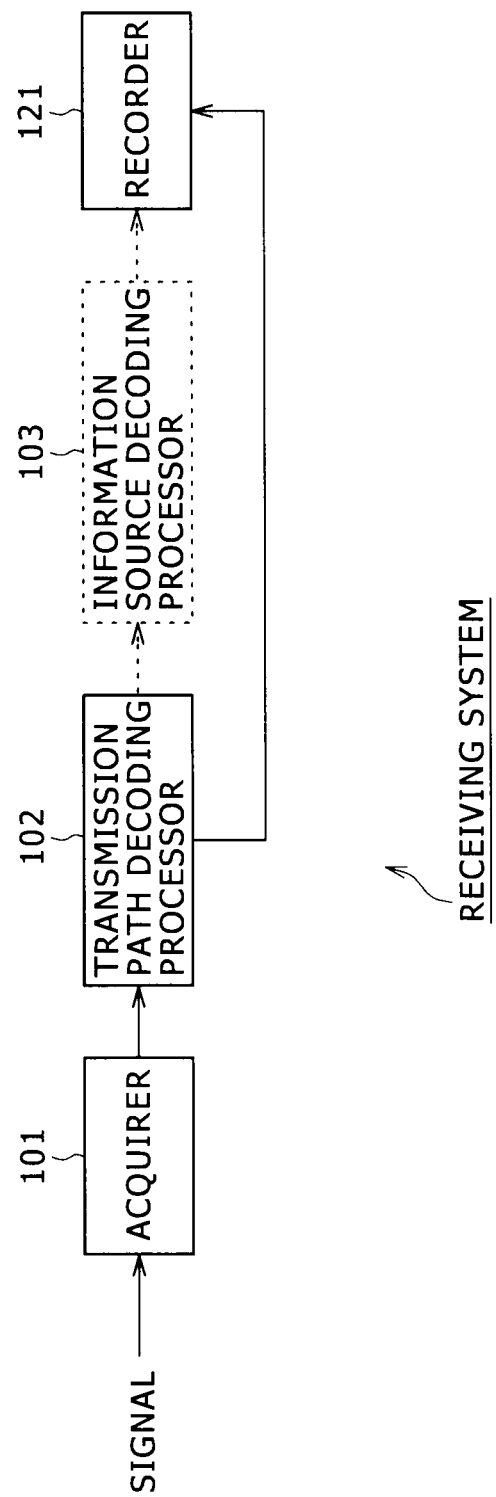

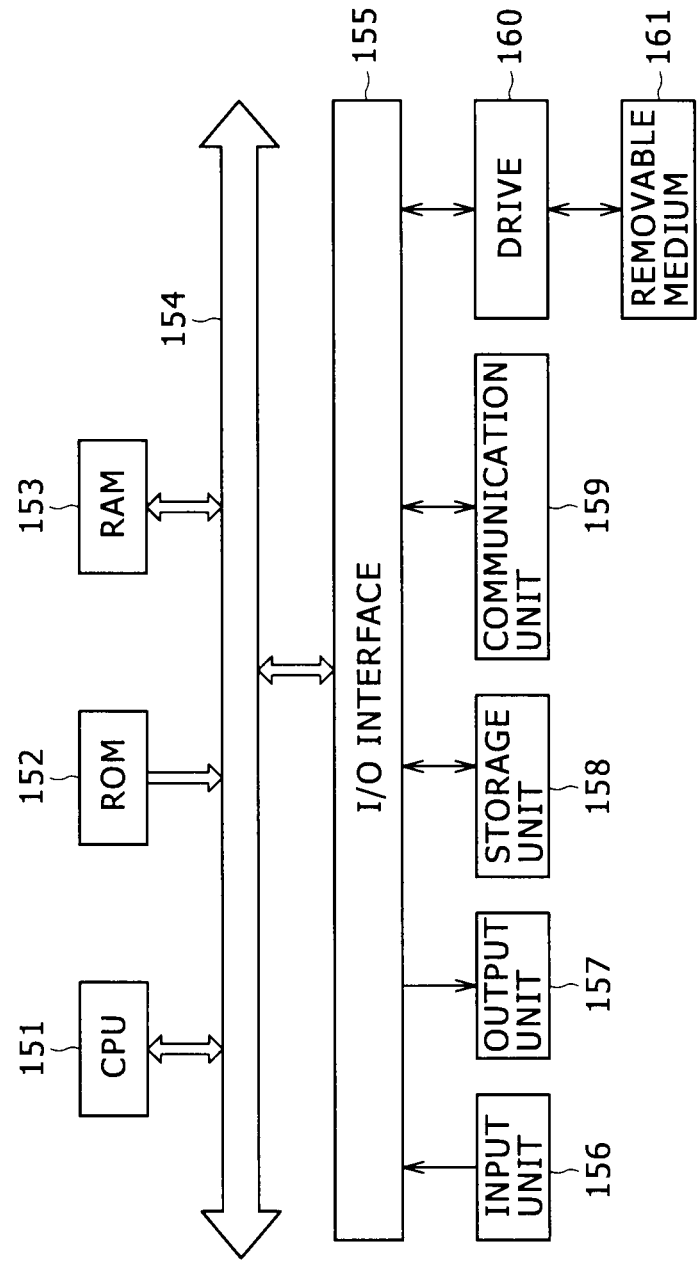

RECEIVING DEVICE, RECEIVING METHOD, AND PROGRAM

BACKGROUND OF THE INVENTION

1. Field of the Invention

The present invention relates to receiving devices, receiving methods, and programs, and particularly to a receiving device, a receiving method, and a program that are so configured as to allow suppression of the power consumption in the case of receiving warning information in the waiting state.

2. Description of the Related Art

As a modulation system for digital terrestrial broadcasting, there has been proposed the orthogonal frequency division multiplexing (OFDM) system, in which a large number of orthogonal carriers are used and each carrier is modulated by phase shift keying (PSK) or quadrature amplitude modulation (QAM).

The OFDM system has the following characteristic. Specifically, because the whole of the transmission band is divided by a large number of subcarriers, the band per one subcarrier is narrow and thus the transmission speed is low. However, the total transmission speed is equivalent to that of related-art modulation systems.

Furthermore, the OFDM system has a characteristic that the large number of subcarriers are transmitted in parallel and thus the symbol rate is low. Therefore, the OFDM system also has a characteristic that the duration of the multipath relative to the duration of one symbol can be shortened and thus the susceptibility to the influence of the multipath can be lowered.

Moreover, data are allocated to the plural subcarriers. Therefore, the OFDM system has a characteristic that a transmitting circuit can be configured by using an inverse fast Fourier transform (IFFT) operation circuit that performs inverse Fourier transform in modulation and a receiving circuit can be configured by using a fast Fourier transform (FFT) operation circuit that performs Fourier transform in demodulation.

Because of the above-described characteristics, the OFDM system is frequently applied to digital terrestrial broadcasting, which is strongly susceptible to the influence of multipath interference. Examples of the standards of the digital terrestrial broadcasting employing the OFDM system include the integrated services digital broadcasting-terrestrial (ISDB-T) standard.

In the ISDB-T standard, in order to transmit additional information relating to transmission control of the modulated wave or seismic-motion warning information, it is prescribed to transmit an AC signal composed of 204-bit information as one unit by a predetermined subcarrier in OFDM symbols. The AC signal is an additional information signal relating to broadcasting.

The AC signal is subjected to differential BPSK modulation. The differential BPSK modulation is a modulation system in which the data string to be transmitted is subjected to differential encoding and the information (0, 1) resulting from the differential encoding is turned to complex signals (I-signal, Q-signal) having signal points of (+4/3, 0) and (−4/3, 0).

FIG. 1 is a diagram showing seismic-motion warning information of the AC (Auxiliary Channel) signal.

In FIG. 1, the numerals given below the respective pieces of information each represent the bit positions of the corresponding information on the basis of the beginning of the AC signal. The length of each piece of information in the lateral direction is not proportional to the number of bits.

As shown on the upper row of FIG. 1, the AC signal configured as one unit by 204-bit information is made up of a 1-bit reference signal of differential modulation, a 3-bit configuration identification, and additional information relating to transmission control of the modulated wave or seismic-motion warning information, composed of 200 bits, in that order from the beginning.

The reference signal is a signal serving as the reference amplitude and the reference phase of differential demodulation.

The configuration identification is a signal for identifying the configuration of the AC signal. 000, 010, 011, 100, 101, and 111 of the configuration identification indicate that additional information relating to transmission control of the modulated wave is transmitted. 001 and 110 indicate that seismic-motion warning information is transmitted. When the configuration identification is 001 or 110, the seismic-motion warning information is transmitted by the subsequent 200 bits.

The seismic-motion warning information is transmitted by the AC carrier of segment No. 0. The whole of the frequency band used in digital broadcasting compliant with the ISDB-T standard is divided into 13 segments from segment No. 0 to segment No. 12, and the carrier to transmit the AC signal (AC carrier) is prescribed for each segment.

The 200-bit seismic-motion warning information is made up of a 13-bit synchronization signal, a 2-bit start/end flag, a 2-bit update flag, a 3-bit signal identification, an 88-bit seismic-motion warning detailed information, a 10-bit CRC, and a 82-bit parity bit.

The synchronization signal is information indicating the beginning position of the seismic-motion warning information. Specifically, W0="1010111101110" is inserted when the configuration identification is 001 and W1="0101000010001," which is the inverted word of W0, is inserted when the configuration identification is 110, alternately in units of frames.

The start/end flag is 00 when "seismic-motion warning detailed information is present," and is 11 when "seismic-motion warning detailed information is absent."

The update flag is incremented by one every time a change occurs in the contents of the series of seismic-motion warning detailed information transmitted when the start/end flag is 00, and notifies the receiver of that the signal identification and the seismic-motion information are updated.

The signal identification is a signal used for identifying the kind of seismic-motion warning detailed information, which follows the signal identification.

000 of the signal identification indicates that "corresponding region is present regarding seismic-motion warning detailed information," and 001 indicates that "corresponding region is absent regarding seismic-motion warning detailed information." That "corresponding region is present regarding seismic-motion warning detailed information" means that the subject region of the seismic-motion warning is present in the broadcasting area. That "corresponding region is absent regarding seismic-motion warning detailed information" means that the subject region of the seismic-motion warning is absent in the broadcasting area.

010 of the signal identification indicates that "corresponding region is present regarding test signal of seismic-motion warning detailed information," and 011 indicates that "corresponding region is absent regarding test signal of seismic-motion warning detailed information." 111 indicates that "seismic-motion warning detailed information is absent (broadcaster identification)." 100, 101, and 110 of the signal identification are undefined.

When the signal identification is any of 000, 001, 010, and 011, information on the current time when the seismic-motion warning information is sent out, information indicating the subject region of the seismic-motion warning, and information relating to the seismic source of the seismic-motion warning are transmitted as seismic-motion warning detailed information.

When the signal identification is 111, the broadcaster identification is transmitted as seismic-motion warning detailed information. When it is any of 100, 101, and 110, ALL1 is transmitted as seismic-motion warning detailed information.

The CRC is a CRC code generated by a generator polynominal about the bits from the 22-nd bit to the 112-th bit defined on the basis of the beginning of the AC signal.

The parity bit is an error correction code generated by a shortened code (187, 107) of a difference-set cyclic code (273, 191) about the bits from the 18-th bit to the 122-nd bit defined on the basis of the beginning of the AC signal.

The related art of the present invention is disclosed in e.g. STD-B31 <http://www.arib.or.jp/english/html/overview/doc/2-STD-B31v1_8.pdf>.

SUMMARY OF THE INVENTION

FIG. 2 is a block diagram showing a configuration example of a seismic-motion warning information decoding circuit.

The seismic-motion warning information decoding circuit includes a differential demodulation circuit 51, a bit determination circuit 52, a difference-set cyclic code decoding circuit 53, and a CRC circuit 54.

For example, it is envisaged that decoding of seismic-motion warning information transmitted by an AC signal is performed in the seismic-motion warning information decoding circuit having such a configuration. The seismic-motion warning information decoding circuit is provided in a receiver incorporated in a receiving device such as a television receiver or recording apparatus.

In the receiver, e.g. the following units are provided in addition to the seismic-motion warning information decoding circuit: tuner, band-pass filter, A/D conversion circuit, digital quadrature demodulation circuit, FFT operation circuit, carrier demodulation circuit, and error correction circuit. The details of the configurations of the receiving device and the receiver will be described later.

An OFDM signal demodulated by the digital quadrature demodulation circuit in the receiver is subjected to FFT in the FFT operation circuit and then input to the seismic-motion warning information decoding circuit. The signal input to the seismic-motion warning information decoding circuit is a complex signal composed of a real-axis component (I-signal) and an imaginary-axis component (Q-signal).

The differential demodulation circuit 51 performs differential demodulation for the AC signal input as the complex signal to generate a complex signal having the signal point corresponding to the original information bit. The signal resulting from the differential demodulation by the differential demodulation circuit 51 is supplied to the bit determination circuit 52.

The bit determination circuit 52 makes a bit determination based on the signal resulting from the differential demodulation. Specifically, the bit determination circuit 52 determines which bit value of "0" and "1" the modulated value is, from the signal point of the signal resulting from the differential demodulation on the IQ plane, and outputs one bit value. The AC signal turned to a bit stream is output from the bit determination circuit 52. The AC signal output from the bit determination circuit 52 is supplied to the difference-set cyclic code decoding circuit 53.

The difference-set cyclic code decoding circuit 53 detects the beginning of the frame of the AC signal based on a frame synchronization signal supplied from a synchronization/frame detection circuit (not shown). After receiving the bits up to the 204-th bit, which is the last bit configuring the AC signal, the difference-set cyclic code decoding circuit 53 performs error correction by using a difference-set cyclic code included in the seismic-motion warning information as the 82-bit parity bit. The difference-set cyclic code decoding circuit 53 outputs the seismic-motion warning information for which the error correction has been performed to the CRC circuit 54.

Furthermore, the difference-set cyclic code decoding circuit 53 outputs an error correction success/failure signal indicating the success and failure of the error correction. The error correction success/failure signal indicates "OK" if the error correction succeeds, and indicates "NG" if the error correction fails.

The CRC circuit 54 performs a CRC by using the 10-bit CRC code included in the seismic-motion warning information, and outputs a CRC success/failure signal indicating the success and failure of the CRC and the seismic-motion warning information. The CRC success/failure signal indicates "OK" if the CRC succeeds, and indicates "NG" if the CRC fails.

The seismic-motion warning information output from the CRC circuit 54 is all pieces of information included in the seismic-motion warning information, or partial pieces of information such as the start/end flag, the update flag, the signal identification, and the seismic-motion warning detailed information, among the pieces of information included in the seismic-motion warning information.

The error correction success/failure signal output from the difference-set cyclic code decoding circuit 53 and the CRC success/failure signal and the seismic-motion warning information output from the CRC circuit 54 are written to a register of an inter-integrated circuit (I2C) in the receiver. A controller that has read out the seismic-motion warning information from the register in the receiver outputs screen displaying and/or sound to thereby execute processing for notifying information relating to the earthquake to the user.

The reception of seismic-motion warning information is carried out also when the state of the receiving device such as a television receiver is the waiting state. In the waiting state, although the main power supply is in the on-state, a display unit and a speaker are not activated and thus screen displaying and audio output are not performed. If e.g. the power supply button of a remote controller is pressed in the waiting state, the state of the receiving device is switched to the on-state, so that screen displaying and audio output are started.

It is preferable that detection of seismic-motion warning information be continued also in the waiting state and information relating to an earthquake be notified to the user when seismic-motion warning information is transmitted, as long as the main power supply is in the on-state and operation is possible.

Furthermore, also from the viewpoint of consideration for recent environmental problems, it is preferable that the power consumption in the waiting state be as low as possible.

There is a need for the present invention to allow suppression of the power consumption in the case of receiving warning information in the waiting state.

According to one embodiment of the present invention, there is provided a receiving device including receiving means for receiving only a partial segment among a plurality of segments obtained by dividing a frequency band of one physical channel when the receiving device is in a waiting state, and returning from the waiting state to an activated state when warning information is transmitted, if transmission of the warning information by the partial segment is possible.

According to another embodiment of the present invention, there is provided a receiving method, indlucing the step of receiving only a partial segment among a plurality of segments obtained by dividing a frequency band of one physical channel when a device is in a waiting state, and returning from the waiting state to an activated state when warning information is transmitted, if transmission of the warning information by the partial segment is possible.

According to still another embodiment of the present invention, there is provided a program for causing a computer to execute processing including the step of receiving only a partial segment among a plurality of segments obtained by dividing a frequency band of one physical channel when a device is in a waiting state, and returning from the waiting state to an activated state when warning information is transmitted, if transmission of the warning information by the partial segment is possible.

The embodiments of the present invention allow suppression of the power consumption in the case of receiving warning information in the waiting state.

BRIEF DESCRIPTION OF THE DRAWINGS

FIG. 19 is a block diagram showing a configuration example of a third mode of the receiving system to which the receiver is applied; and FIG. 20 is a block diagram showing a configuration example of the hardware of a computer.

DETAILED DESCRIPTION OF THE PREFERRED EMBODIMENTS

<First Embodiment>
[Configuration of Receiving Device]

Figure 3:
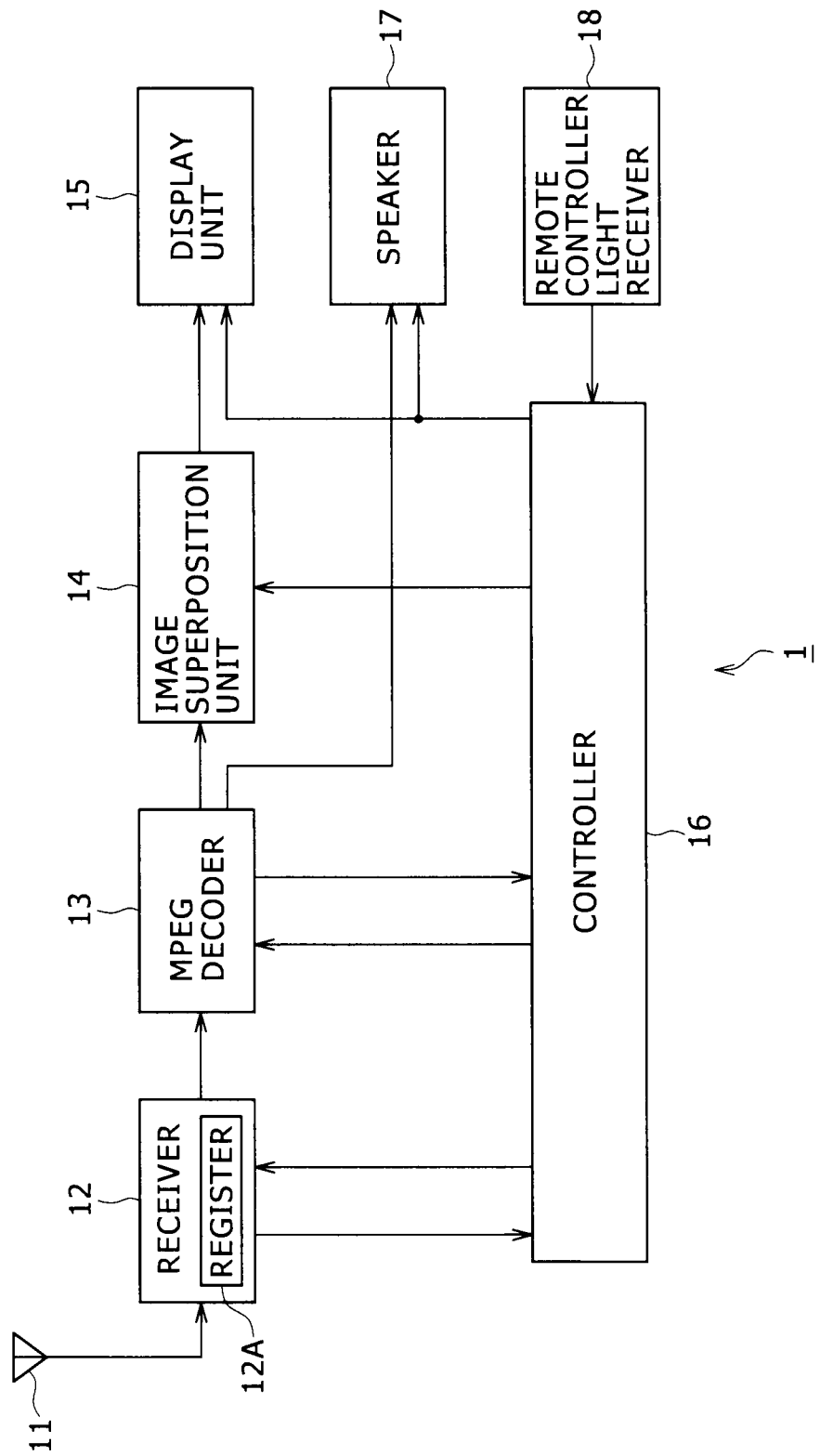
FIG. 3 is a block diagram showing a configuration example of a receiving device according to one embodiment of the present invention.

FIG. 3 is a block diagram showing a configuration example of a receiving device according to one embodiment of the present invention.

A receiving device 1 is apparatus, such as a television receiver or recording apparatus, capable of receiving e.g. digital broadcasting compliant with the ISDB-T standard. Broadcast waves transmitted from a broadcast station are received by an antenna 11 and the received signal is supplied to a receiver 12.

The receiver 12 selects a predetermined transmission channel and executes demodulation processing to thereby extract a digital signal of "0" and "1."Furthermore, the receiver 12 performs error correction for the demodulated information and acquires TS packets transmitted from the broadcast station. The TS packet includes video data, audio data, and so forth. The TS packet in which the video and audio data are stored is supplied to a MPEG decoder 13.

In addition, if seismic-motion warning information is transmitted by an AC signal, the receiver 12 decodes the seismic-motion warning information and outputs it to a controller 16. The supply of the seismic-motion warning information is carried out through reading of the seismic-motion warning information written to an I2C register 12A by the controller 16.

The receiver 12 determines whether or not seismic-motion warning information is transmitted based on the received partial information among all pieces of information of the AC signal before receiving all pieces of information of the AC signal and outputting seismic-motion warning information. If the receiver 12 determines that seismic-motion warning information is transmitted, it generates an early detection flag to indicate that seismic-motion warning information is transmitted and outputs the flag to the controller 16. The early detection flag is also written to the register 12A and read out by the controller 16 similarly to the seismic-motion warning information.

The MPEG decoder 13 decodes the TS packet supplied from the receiver 12 to thereby extract the image data and the audio data, and outputs the image data and the audio data to an image superposition unit 14 and an audio processing circuit (not shown), respectively. Predetermined processing is executed for the audio data in the audio processing circuit and sound is output from a speaker 17 in synchronization with image displaying.

The image superposition unit 14 superimposes information supplied from the controller 16 on the image whose data is supplied from the MPEG decoder 13, and outputs, to a display unit 15, the data of the image on which information relating to an earthquake is superimposed. If information relating to an earthquake is not supplied from the controller 16, the image superposition unit 14 outputs, to the display unit 15, image data supplied from the MPEG decoder 13 as it is.

The display unit 15 is a display such as a liquid crystal display (LCD) or a plasma display panel (PDP). The display unit 15 displays various kinds of images such as an image on which information relating to an earthquake is superimposed based on the data supplied from the image superposition unit 14.

The controller 16 controls the operation of the whole of the receiving device 1 based on information supplied from a remote controller light receiver 18.

For example, if the controller 16 reads out seismic-motion warning information from the register 12A of the receiver 12, it outputs information relating to the earthquake to the image superposition unit 14 depending on the contents of the seismic-motion warning information so that the information may be so displayed as to be superimposed on an image. Furthermore, when notifying the information relating to the earthquake to the user not by screen displaying but by sound, the controller 16 outputs, to the speaker 17, sound data for notifying the information relating to the earthquake to the user to thereby output warning sound and/or voice.

Furthermore, when the early detection flag is read out from the register 12A before seismic-motion warning information is read out and the receiving device 1 is in the waiting state, the controller 16 activates the display unit 15 and the speaker 17. The activation of the display unit 15 and the speaker 17 is carried out as preparation for allowing the information relating to the earthquake to be rapidly notified to the user when the seismic-motion warning information is received later.

The speaker 17 outputs sound such as warning sound for notifying the information relating to the earthquake to the user based on the audio data supplied from the controller 16.

The remote controller light receiver 18 receives a signal transmitted from a remote controller and outputs information indicating the operation directed by the user to the controller 16.

Figure 4:
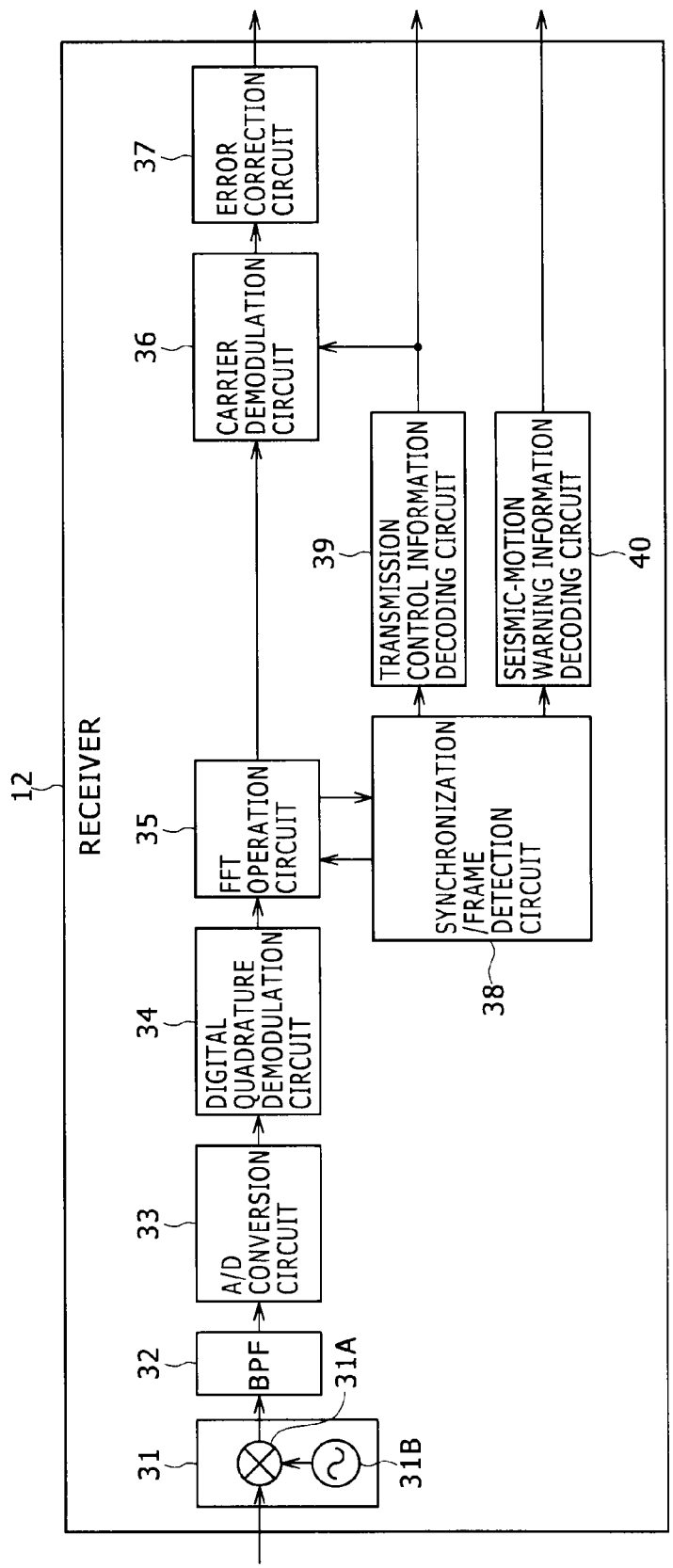
FIG. 4 is a block diagram showing a configuration example of a receiver in FIG. 3.

FIG. 4 is a block diagram showing a configuration example of the receiver 12 in FIG. 3.

The receiver 12 includes a tuner 31, a BPF 32, an A/D conversion circuit 33, a digital quadrature demodulation circuit 34, an FFT operation circuit 35, a carrier demodulation circuit 36, an error correction circuit 37, a synchronization/frame detection circuit 38, a transmission control information decoding circuit 39, and a seismic-motion warning information decoding circuit 40. The received signal, which is an OFDM signal output from the antenna 11, is supplied to the tuner 31.

The tuner 31 is composed of a multiplier circuit 31A and a local oscillator 31B, and performs frequency conversion for an RF signal supplied from the antenna 11 to generate an IF signal. The generated IF signal is supplied to the BPF (Band Pass Filter) 32.

The BPF 32 performs filtering for the IF signal and outputs the resulting signal to the A/D conversion circuit 33.

The A/D conversion circuit 33 digitalizes the IF signal by performing A/D conversion and outputs the resulting signal to the digital quadrature demodulation circuit 34.

The digital quadrature demodulation circuit 34 performs quadrature demodulation of the digitalized IF signal by using a carrier signal of a predetermined frequency (carrier frequency), and outputs a baseband OFDM signal to the FFT operation circuit 35. The baseband signal output from the digital quadrature demodulation circuit 34 is a complex signal including a real-axis component and an imaginary-axis component as the result of the quadrature demodulation.

The FFT operation circuit 35 extracts the signal corresponding to the effective symbol length from the signal of one OFDM symbol and performs an FFT operation for the extracted signal. That is, the FFT operation circuit removes the signal corresponding to the guard interval length from one OFDM symbol and performs the FFT for the left signal.

The signals modulated on the respective subcarriers, extracted through the FFT performed by the FFT operation circuit 35, are each a complex signal composed of a real-axis component and an imaginary-axis component. The signal extracted by the FFT operation circuit 35 is supplied to the carrier demodulation circuit 36 and the synchronization/frame detection circuit 38.

The carrier demodulation circuit 36 performs carrier demodulation for the signals that are output from the FFT operation circuit 35 and demodulated from the respective subcarriers. Specifically, the carrier demodulation circuit 36 executes differential demodulation processing for a differential modulation signal (DQPSK signal) and equalization processing for a synchronous modulation signal (QPSK, 16QAM, 64QAM signal), to output the signal obtained through these kinds of processing to the error correction circuit 37.

The error correction circuit 37 executes deinterleave processing for the signal subjected to interleave processing on the transmission side, and executes processing such as depuncture, Viterbi decoding, diffusion signal removal, and RS decoding, to output the decoded data. The decoded data output from the error correction circuit 37 is supplied to the MPEG decoder 13.

The synchronization/frame detection circuit 38 executes various kinds of synchronization processing based on the baseband OFDM signal supplied from the digital quadrature demodulation circuit 34 to the FFT operation circuit 35 and the signals demodulated from the respective subcarriers by the FFT operation circuit 35. For example, the synchronization/frame detection circuit 38 detects the boundary of the OFDM symbol by executing the synchronization processing and outputs information specifying the range and timing of FFT to the FFT operation circuit 35.

Furthermore, the synchronization/frame detection circuit 38 extracts a TMCC signal as transmission control information from a predetermined subcarrier of the signal demodulated by the FFT operation circuit 35, and detects the synchronization signal of the TMCC signal to detect the boundary of the OFDM frame. The synchronization/frame detection circuit 38 outputs, to the transmission control information decoding circuit 39, a frame synchronization signal indicating the position of the detected boundary of the OFDM frame together with the TMCC signal.

The synchronization/frame detection circuit 38 extracts an AC signal from a predetermined subcarrier of the signal demodulated by the FFT operation circuit 35, and detects the synchronization signal of the AC signal to detect the boundary of the OFDM frame. The synchronization/frame detection circuit 38 outputs, to the seismic-motion warning information decoding circuit 40, a frame synchronization signal indicating the position of the detected boundary of the OFDM frame together with the AC signal.

The transmission control information decoding circuit 39 performs error correction by a difference-set cyclic code for TMCC information included in the TMCC signal for which synchronization is ensured. Furthermore, the transmission control information decoding circuit 39 outputs the TMCC information for which the error correction has been performed to the carrier demodulation circuit 36, to control the processing in the carrier demodulation circuit 36.

The seismic-motion warning information decoding circuit 40 performs error correction by a difference-set cyclic code and performs a CRC by a CRC code for seismic-motion warning information included in the AC signal for which synchronization is ensured. The seismic-motion warning information decoding circuit 40 outputs the seismic-motion warning information for which the error correction and the CRC have been performed.

Furthermore, if the seismic-motion warning information decoding circuit 40 detects the advent of transmitted seismic-motion warning information based on received partial information of the AC signal before outputting the seismic-motion warning information, it generates and outputs the early detection flag. The seismic-motion warning information and the early detection flag output from the seismic-motion warning information decoding circuit 40 are written to the register 12A (not shown in FIG. 4).

Figure 5:
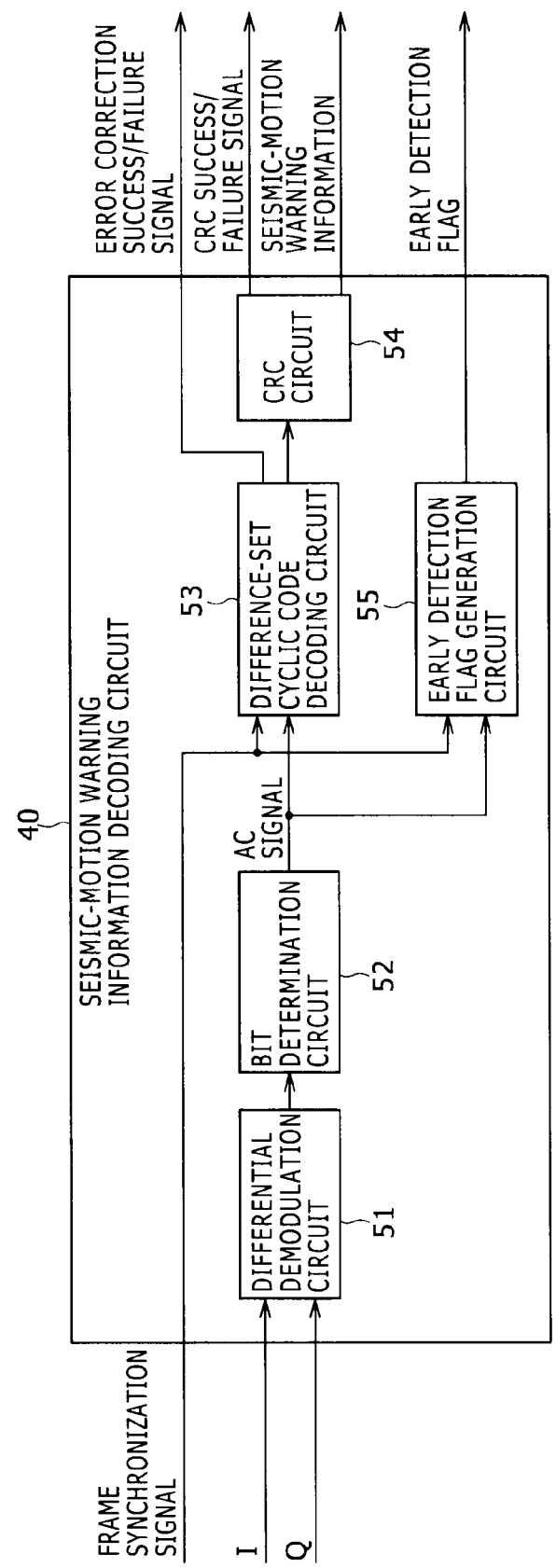
FIG. 5 is a block diagram showing a configuration example of a seismic-motion warning information decoding circuit in FIG. 4.

FIG. 5 is a block diagram showing a configuration example of the seismic-motion warning information decoding circuit 40 in FIG. 4.

Figure 2:
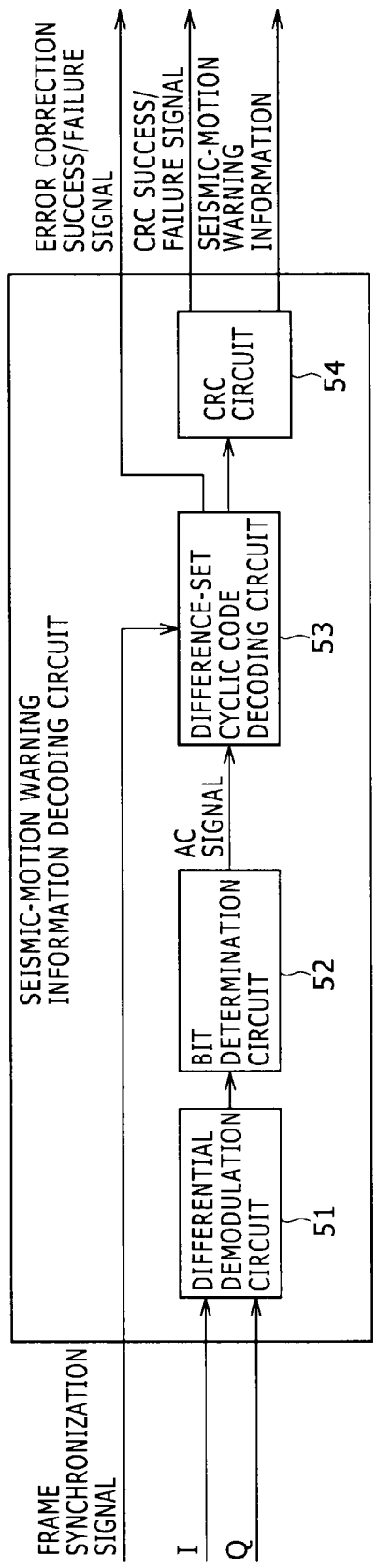
FIG. 2 is a block diagram showing a configuration example of a seismic-motion warning information decoding circuit.

Among the components shown in FIG. 5, the same components as those shown in FIG. 2 are given the same numerals. Overlapping description thereof is accordingly omitted.

The configuration of the seismic-motion warning information decoding circuit 40 shown in FIG. 5 is different from the configuration of FIG. 2 in that an early detection flag generation circuit 55 is provided besides the differential demodulation circuit 51, the bit determination circuit 52, the difference-set cyclic code decoding circuit 53, and the CRC circuit 54. The AC signal output from the synchronization/frame detection circuit 38 in FIG. 4 is input to the differential demodulation circuit 51 and the frame synchronization signal is input to the difference-set cyclic code decoding circuit 53 and the early detection flag generation circuit 55.

The differential demodulation circuit 51 performs differential demodulation for the input AC signal to generate a complex signal having the signal point corresponding to the original information bit. The signal resulting from the differential demodulation by the differential demodulation circuit 51 is supplied to the bit determination circuit 52.

The bit determination circuit 52 makes a bit determination based on the signal resulting from the differential demodulation. The respective bits configuring the AC signal turned to a bit stream as the result of the bit determination are supplied to the difference-set cyclic code decoding circuit 53 and the early detection flag generation circuit 55 sequentially from the beginning bit one bit by one bit.

The difference-set cyclic code decoding circuit 53 detects the beginning of the frame of the AC signal based on the input frame synchronization signal. After receiving the bits up to the 204-th bit of the AC signal, the difference-set cyclic code decoding circuit 53 performs error correction by a difference-set cyclic code included in the seismic-motion warning information as the 82-bit parity bit, and outputs the seismic-motion warning information for which the error correction has been performed to the CRC circuit 54. Furthermore, the difference-set cyclic code decoding circuit 53 outputs an error correction success/failure signal indicating the success and failure of the error correction.

The CRC circuit 54 performs a CRC by the 10-bit CRC code included in the seismic-motion warning information, and outputs a CRC success/failure signal indicating the success and failure of the CRC and the seismic-motion warning information. Specifically, the seismic-motion warning information output from the CRC circuit 54 is partial pieces of seismic-motion warning information, excluding the reference signal, the CRC code, the parity bit, and so forth.

The error correction success/failure signal output from the difference-set cyclic code decoding circuit 53 and the CRC success/failure signal and the seismic-motion warning information output from the CRC circuit 54 are written to the register 12A.

The early detection flag generation circuit 55 detects the beginning of the frame of the AC signal based on the input frame synchronization signal. Furthermore, the early detection flag generation circuit 55 receives the information supplied from the bit determination circuit 52 and determines whether or not seismic-motion warning information is transmitted based on the received information before receiving all of 204 bits configuring the AC signal.

The early detection flag generation circuit 55 generates and outputs the early detection flag if it detects the advent of transmitted seismic-motion warning information based on the received partial information of the AC signal. The early detection flag output from the early detection flag generation circuit 55 is also written to the register 12A.

The systems of the error detection and the error correction employed for the transmission of seismic-motion warning information are ones employing a CRC code and a difference-set cyclic code. Because a parity bit is added to data part in both systems, no change occurs in the data part itself in encoding. Therefore, if the reception status is favorable, a correct signal could be received by the receiving device 1 even when error correction is not performed.

In the seismic-motion warning information decoding circuit 40 of FIG. 5, at the timing of the completion of reception of bits up to a halfway bit among 204 bits configuring the AC signal, whether or not seismic-motion warning information is transmitted is determined based on the received partial information.

The timing of the determination as to whether or not seismic-motion warning information is transmitted will be described below.

[Working Example 1]

A description will be made below about the case in which whether or not seismic-motion warning information is transmitted is determined at the timing of the completion of reception of the bits from the second bit of the AC signal to the fourth bit.

The early detection flag generation circuit 55 receives the bits from the second bit of the AC signal to the fourth bit. If these received 3 bits are 001 or 110, the early detection flag generation circuit 55 determines that seismic-motion warning information is transmitted and generates the early detection flag. As described above, 001 or 110 of the configuration identification composed of 3 bits from the second bit to the fourth bit indicates that the information subsequent to the configuration identification is not additional information relating to transmission control of the modulated wave but seismic-motion warning information.

In this case, the start/end flag and the signal identification are not used for the determination as to whether or not seismic-motion warning information is transmitted. Whether or not seismic-motion warning information is transmitted is determined based on the configuration identification without discrimination as to whether seismic-motion warning detailed information is present or absent.

[Working Example 2]

A description will be made below about the case in which whether or not seismic-motion warning information is transmitted is determined at the timing of the completion of reception of the bits from the second bit of the AC signal to a predetermined bit set in advance among the bits in the range from the fifth bit to the 17-th bit.

If the determination is made at the timing of the completion of reception of the bits up to the 17-th bit, i.e. the last of the synchronization signal, the early detection flag generation circuit 55 receives the bits from the second bit of the AC signal to the 17-th bit. When the configuration identification is 001 or 110 and 13 bits of the synchronization signal correspond with 13 bits of a known synchronization signal, the early detection flag generation circuit 55 determines that seismic-motion warning information is transmitted and generates the early detection flag. In the early detection flag generation circuit 55, a bit sequence (13 bits) of the synchronization signal included in seismic-motion warning information is set as known information.

If the determination is made at the timing of the completion of reception of the bits up to a bit previous to the 17-th bit, i.e. a halfway bit of the synchronization signal, the early detection flag generation circuit 55 receives the bits from the second bit of the AC signal to the predetermined halfway bit of the synchronization signal. When the configuration identification is 001 or 110 and the received part of the synchronization signal corresponds with the corresponding part of a known synchronization signal, the early detection flag generation circuit 55 determines that seismic-motion warning information is transmitted and generates the early detection flag.

Also in this case, the start/end flag and the signal identification are not used for the determination as to whether or not seismic-motion warning information is transmitted. Therefore, whether seismic-motion warning detailed information is present or absent is not discriminated.

[Working Example 3]

A description will be made below about the case in which whether or not seismic-motion warning information is transmitted is determined at the timing of the completion of reception of the bits from the second bit of the AC signal to the 18-th bit or the 19-th bit.

If the determination is made at the timing of the completion of reception of the bits up to the 18-th bit, the early detection flag generation circuit 55 receives the bits from the second bit of the AC signal to the 18-th bit. When the configuration identification is 001 or 110 and the first bit of two bits of the start/end flag, i.e. the 18-th bit, is 0, the early detection flag generation circuit 55 determines that seismic-motion warning information is transmitted and generates the early detection flag.

If the determination is made at the timing of the completion of reception of the bits up to the 19-th bit, the early detection flag generation circuit 55 receives the bits from the second bit of the AC signal to the 19-th bit. When the configuration identification is 001 or 110 and two bits of the start/end flag, i.e. the 18-th bit and the 19-th bit, are 00, the early detection flag generation circuit 55 determines that seismic-motion warning information is transmitted and generates the early detection flag.

As described above, the start/end flag is 00 when "seismic-motion warning detailed information is present" and is 11 when "seismic-motion warning detailed information is absent." When the first bit of the start/end flag is 0 or when two bits of the start/end flag are 00, it is possible to determine that "seismic-motion warning detailed information is present."

In this case, the start/end flag is used for the determination as to whether or not seismic-motion warning information is transmitted, and thus it is possible to discriminate whether seismic-motion warning detailed information is present or absent. On the other hand, the signal identification is not used. Therefore, no discrimination is made as to whether transmitted seismic-motion warning detailed information is a test signal or real signal of seismic-motion warning detailed information, or whether "corresponding region is present" or "corresponding region is absent."

It is also possible that the bits up to the 20-th bit or the 21-st bit are received in addition to the bits up to the 18-th bit or the 19-th bit and the above-described determination by use of one bit of the 18-th bit or two bits of the 18-th bit and the 19-th bit is made.

[Working Example 4]

A description will be made below about the case in which whether or not seismic-motion warning information is transmitted is determined at the timing of the completion of reception of the bits from the second bit of the AC signal to the 24-th bit.

The early detection flag generation circuit 55 receives the bits from the second bit of the AC signal to the 24-th bit. If the configuration identification is 001 or 110 and the start/end flag is 00 and the signal identification is desired one, the early detection flag generation circuit 55 determines that seismic-motion warning information is transmitted and generates the early detection flag.

As described above, 000 of the signal identification indicates that "corresponding region is present regarding seismic-motion warning detailed information." For example, when the configuration identification is 001 or 110 and the start/end flag is 00 and the signal identification is 000, it is determined that seismic-motion warning information is transmitted.

It is also possible that the early detection flag is not generated if the signal identification is 010 or 011 and thus it is determined that a test signal is transmitted. Alternatively, it is also possible that it is determined that seismic-motion warning information is transmitted and the early detection flag is generated only when the signal identification is 000 or 010 and thus "corresponding region is present."

[Summarization of Working Examples]

Figure 6:
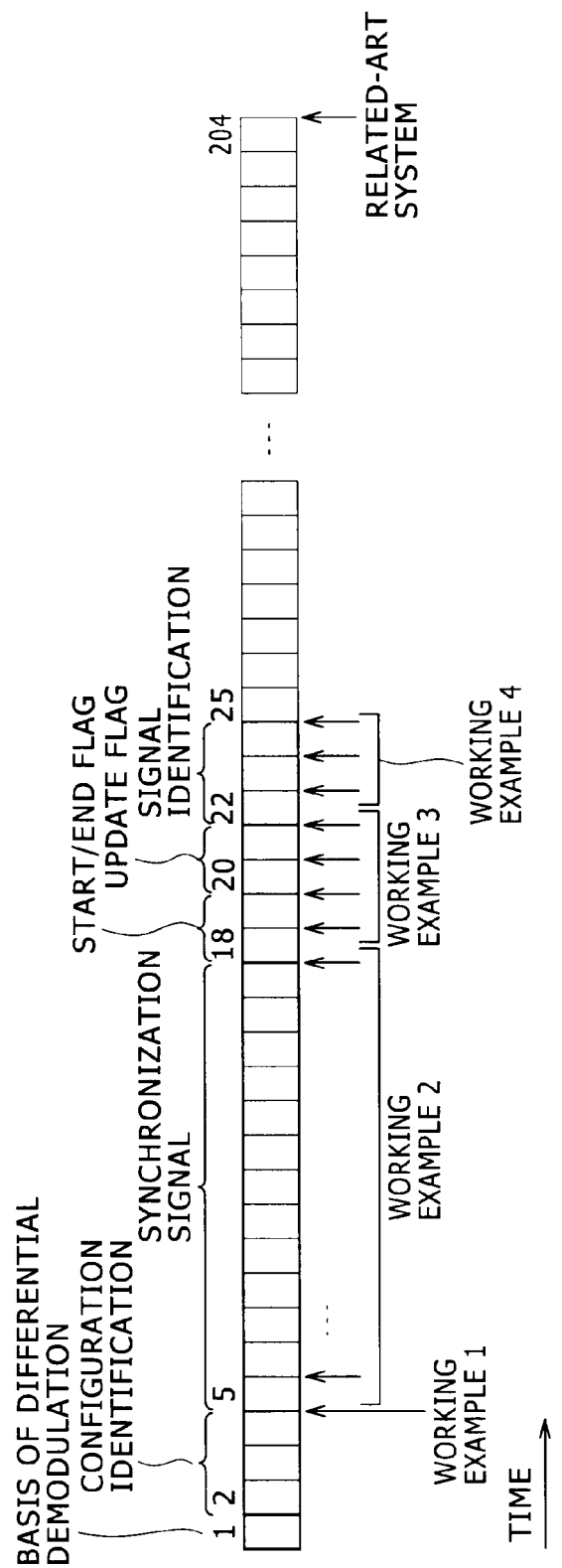
FIG. 6 is a diagram collectively showing working examples.

FIG. 6 is a diagram collectively showing the above-described four examples.

In working example 1, the bits from the second bit to the fourth bit are received and the 3-bit configuration identification is used for the determination as to whether or not seismic-motion warning information is transmitted.

In working example 2, the bits from the second bit to a predetermined bit among 13 bits configuring the synchronization signal are received and the configuration identification and all or part of the synchronization signal are used for the determination as to whether or not seismic-motion warning information is transmitted.

In working example 3, the bits from the second bit to one of the 18-th bit, the 19-th bit, the 20-th bit, and the 21-st bit are received and the configuration identification and the start/end flag are used for the determination as to whether or not seismic-motion warning information is transmitted.

In working example 4, the bits from the second bit to the 24-th bit are received and the configuration identification, the start/end flag, and the signal identification are used for the determination as to whether or not seismic-motion warning information is transmitted.

As just described, four patterns will be possible as the pattern of the bits used for the determination as to whether or not seismic-motion warning information is transmitted.

[Operation of Receiving Device]

With reference to a flowchart of FIG. 7, the processing by the receiver 12 will be described below.

Figure 7:
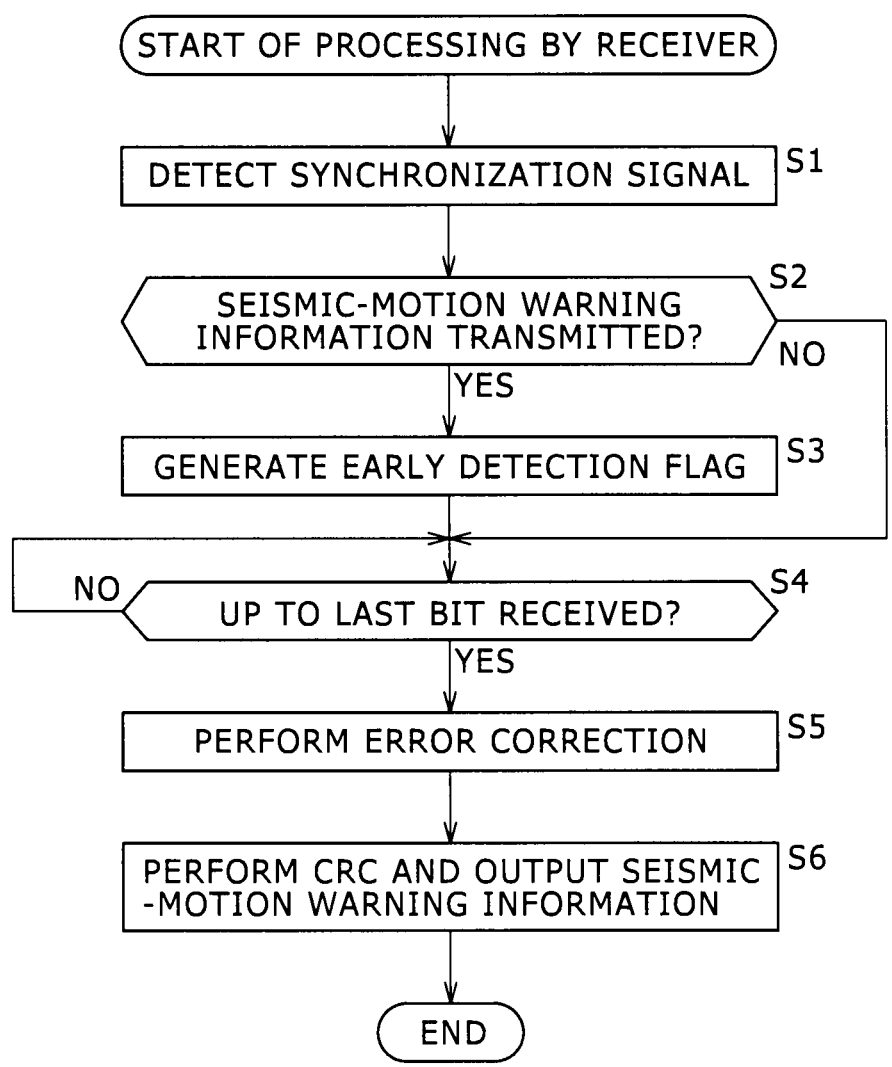
FIG. 7 is a flowchart for explaining processing by the receiver.

The processing of FIG. 7 is started when an AC signal is supplied from the FFT operation circuit 35 to the synchronization/frame detection circuit 38 for example.

In a step S1, the synchronization/frame detection circuit 38 extracts the AC signal from a predetermined subcarrier of the signal demodulated by the FFT operation circuit 35, and detects the synchronization signal of the AC signal to detect the boundary of the OFDM frame. The synchronization/frame detection circuit 38 outputs, to the seismic-motion warning information decoding circuit 40, a frame synchronization signal indicating the position of the detected boundary of the OFDM frame together with the AC signal.

The frame synchronization signal output from the synchronization/frame detection circuit 38 is supplied to the difference-set cyclic code decoding circuit 53 and the early detection flag generation circuit 55 in the seismic-motion warning information decoding circuit 40. Furthermore, for the AC signal output from the synchronization/frame detection circuit 38, differential demodulation is performed in the differential demodulation circuit 51 and a bit determination is made in the bit determination circuit 52. The respective bits that are output from the bit determination circuit 52 and configure the AC signal are received by the difference-set cyclic code decoding circuit 53 and the early detection flag generation circuit 55 sequentially from the beginning bit one bit by one bit.

In a step S2, the early detection flag generation circuit 55 determines whether or not seismic-motion warning information is transmitted.

In this step, the determination is made as described as working examples 1 to 4. For example, if whether or not seismic-motion warning information is transmitted is determined at the timing of the completion of reception of the bits from the second bit of the AC signal to the fourth bit, the early detection flag generation circuit 55 receives the bits from the second bit of the AC signal to the fourth bit, and determines that seismic-motion warning information is transmitted when the configuration identification is 001 or 110.

If it is determined in the step S2 that seismic-motion warning information is transmitted, in a step S3, the early detection flag generation circuit 55 generates the early detection flag and writes it to the register 12A. If it is determined in the step S2 that seismic-motion warning information is not transmitted, the processing of the step S3 is skipped.

In a step S4, the difference-set cyclic code decoding circuit 53 determines whether or not 204 bits configuring the AC signal have been received up to the last bit and waits until determining that the bits up to the last bit have been received.

If it is determined in the step S4 that 204 bits configuring the AC signal have been received up to the last bit, in a step S5, the difference-set cyclic code decoding circuit 53 performs error correction by a difference-set cyclic code. The difference-set cyclic code decoding circuit 53 outputs the seismic-motion warning information for which the error correction has been performed to the CRC circuit 54 and outputs an error correction success/failure signal to the external.

In a step S6, the CRC circuit 54 performs a CRC by the 10-bit CRC code included in the seismic-motion warning information, and outputs a CRC success/failure signal indicating the success and failure of the CRC and the seismic-motion warning information. Thereafter, the processing is ended.

Outputting the early detection flag in the above-described manner enables the receiver 12 to transmit the advent of seismic-motion warning information to the controller 16 before receiving the AC signal up to the last.

With reference to a flowchart of FIG. 8, the processing executed by the controller 16 in linkage with the processing of FIG. 7 will be described below.

Figure 8:
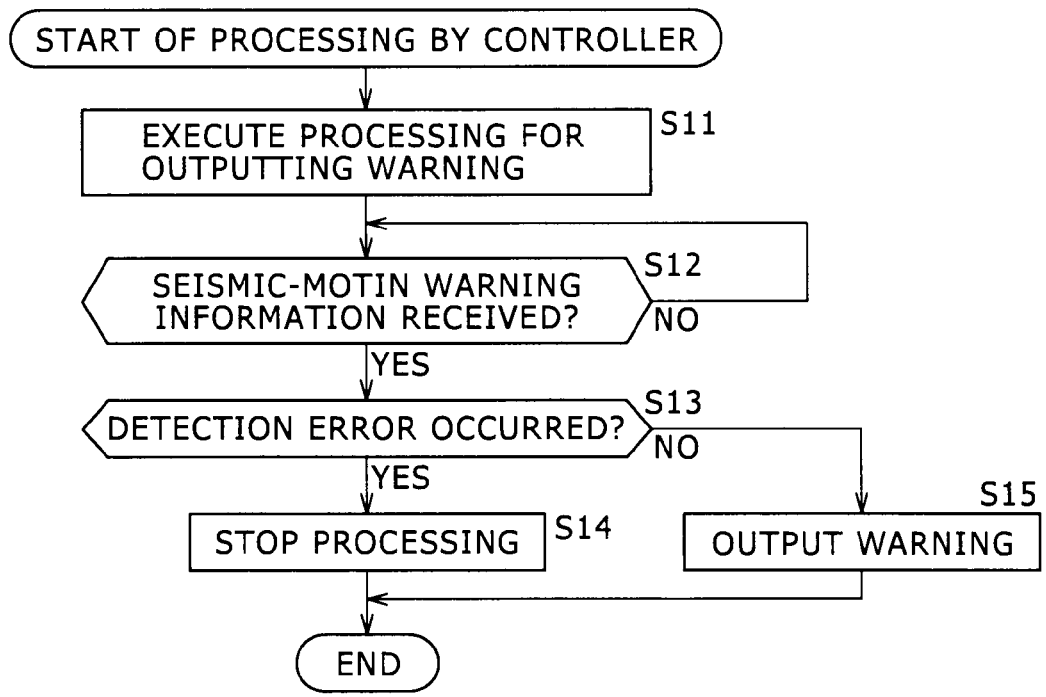
FIG. 8 is a flowchart for explaining processing by a controller.

The processing of FIG. 8 is executed when storing of the early detection flag is detected by the controller 16 through polling as processing of repeatedly checking information stored in the register 12A at a predetermined cycle for example.

In a step S11, the controller 16 executes processing for outputting warning. For example, if the receiving device 1 is in the waiting state and information relating to an earthquake is to be notified to the user through screen displaying, processing of activating the display unit 15 is started.

Among the states of the receiving device 1 are the on-state and the waiting state. In the on-state, the display unit 15 is active and performs screen displaying of video of a program or the like. In the waiting state, although the main power supply is in the on-state, the display unit 15 and the speaker 17 are not activated and thus screen displaying and audio output are not performed. If e.g. the power supply button of a remote controller is pressed in the waiting state, the state of the receiving device 1 is switched to the on-state, so that screen displaying is started.

Also in the waiting state, the receiver 12 is active and executes the processing described with reference to FIG. 7. Furthermore, the polling by the controller 16 is also performed. In the waiting state, the power consumption may be suppressed by stopping the supply of power to the carrier demodulation circuit 36, the error correction circuit 37, and the transmission control information decoding circuit 39 among the components in the receiver 12.

After the activation of the display unit 15, a message indicating that seismic-motion warning information is transmitted may be displayed thereon, or a black screen may be shown thereon until the controller 16 receives seismic-motion warning information.

If the receiving device 1 is in the waiting state and information relating to an earthquake is to be notified to the user by sound, processing of activating the speaker 17 is started.

In a step S12, the controller 16 determines whether or not seismic-motion warning information has been received and waits until determining that it has been received.

The polling by the controller 16 is performed also after the early detection flag is read out from the register 12A. If it is confirmed by the polling that seismic-motion warning information output from the CRC circuit 54 in the seismic-motion warning information decoding circuit 40 is stored in the register 12A, the seismic-motion warning information is read out from the register 12A and received by the controller 16.

If it is determined in the step S12 that seismic-motion warning information has been received, in a step S13, the controller 16 determines whether or not a detection error has occurred.

For example, in the case of working examples 1 to 3, the controller 16 determines that a detection error has occurred when the signal identification included in the seismic-motion warning information received after the early detection flag has a bit pattern other than 000. 000 of the signal identification indicates that "corresponding region is present regarding seismic-motion warning detailed information."

Furthermore, e.g. the following situation possibly occurs in working example 3. Specifically, the start/end flag involves an error at the timing of generation of the early detection flag. Thus, the start/end flag that is actually 11 is regarded as 00 and the early detection flag is sent out. In this case, because 11 is represented by the start/end flag included in the seismic-motion warning information that results from error correction and is received after the sending of the early detection flag, the controller 16 determines that a detection error has occurred.

As described as working example 1, in the case of determining whether or not seismic-motion warning information is transmitted upon receiving the bits from the second bit of the AC signal to the fourth bit, whether seismic-motion warning detailed information is present or absent is not discriminated based on the signal identification in this determination. This applies also to working examples 2 and 3.

Therefore, if the configuration identification is 001 or 110 and the signal identification is any of 001, 010, and 011, the early detection flag is generated by the receiver 12 and processing for outputting warning is started by the controller 16 although actually an earthquake relating to the region in which the receiving device 1 is placed does not occur.

As described above, 001 of the signal identification indicates that "corresponding region is absent regarding seismic-motion warning detailed information." 010 indicates that "corresponding region is present regarding test signal of seismic-motion warning detailed information." 011 indicates that "corresponding region is absent regarding test signal of seismic-motion warning detailed information." Even if the configuration identification is 001 or 110 and seismic-motion warning information is transmitted, actually an earthquake relating to the region in which the receiving device 1 is placed does not occur when the signal identification is any of 001, 010, and 011.

If, as just described, although the early detection flag is received, it is confirmed that actually an earthquake relating to the region in which the receiving device 1 is placed does not occur based on seismic-motion warning information received after the reception of the early detection flag, it is determined that a detection error has occurred.

If it is determined in the step S13 that a detection error has occurred, in a step S14, the controller 16 stops the processing for outputting warning.

If the activation of the display unit 15 has ended and the display unit 15 has entered the state of showing a black screen until seismic-motion warning information is received, the state of the receiving device 1 becomes the waiting state again without displaying of another image. A message notifying the erroneous detection of seismic-motion warning information may be displayed.

On the other hand, if it is determined in the step S13 that a detection error has not occurred, in a step S15, the controller 16 outputs warning based on the seismic-motion warning information.

For example, when notifying information relating to the earthquake by screen displaying, the controller 16 makes the region where the earthquake occurs be displayed on a map based on information indicating the subject region of the seismic-motion warning. Furthermore, the controller 16 makes the seismic source be displayed on a map based on information relating to the seismic source of the seismic-motion warning, and displays the occurrence time of the earthquake based on the occurrence time information.

When notifying information relating to the earthquake by sound, the controller 16 identifies the occurrence time of the earthquake, the region where the earthquake occurs, and the seismic source based on information transmitted as seismic-motion warning detailed information, and makes sound for notifying these pieces of information be output from the speaker 17.

The processing is ended after the processing for outputting warning is stopped in the step S14 or after warning is output in the step S15.

The above-described processing enables the controller 16 to start preparation for notifying information relating to an earthquake to the user before actually receiving seismic-motion warning information even when the receiving device 1 is in the waiting state.

Furthermore, because the display unit 15 and the speaker 17 are activated in advance, the controller 16 can rapidly notify the information relating to an earthquake to the user after receiving the seismic-motion warning information.

[Modification Example]

In the above-described configurations, the early detection flag and seismic-motion warning information output from the receiver 12 are received by the controller 16 by polling. However, the early detection flag and the seismic-motion warning information may be transmitted from the receiver 12 directly to the controller 16.

Figure 9:
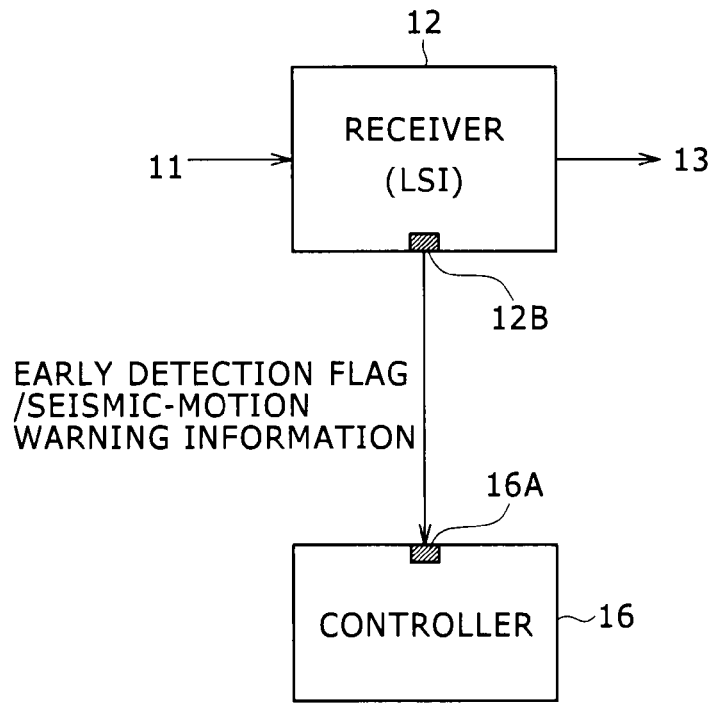
FIG. 9 is a diagram showing a connection example of the receiver and the controller.

FIG. 9 is a diagram showing a connection example of the receiver 12 and the controller 16.

In the example of FIG. 9, a pin 12B of a large scale integrated circuit (LSI) to realize the receiver 12 is connected directly to an interrupt pin 16A of an LSI to realize the controller 16.

If the early detection flag generation circuit 55 (FIG. 5) in the receiver 12 determines that seismic-motion warning information is transmitted in the above-described manner, it generates the early detection flag. The early detection flag generated by the early detection flag generation circuit 55 is output from the pin 12B and input to the interrupt pin 16A of the controller 16.

Similarly, seismic-motion warning information output from the CRC circuit 54 in the receiver 12 is also not written to the register 12A but output from the pin 12B to be input to the interrupt pin 16A of the controller 16.

If the early detection flag is received at the interrupt pin 16A, the controller 16 starts the processing described with reference to FIG. 8 with priority over other kinds of processing. If seismic-motion warning information is received at the interrupt pin 16A, the controller 16 outputs information relating to the earthquake.

If the early detection flag and seismic-motion warning information are received by polling, even when these pieces of information are written to the register 12A of the receiver 12, the controller 16 cannot immediately read out them and delay occurs in some cases depending on the timing of the polling.

The occurrence of such delay can be prevented by allowing the early detection flag and seismic-motion warning information to be input from the receiver 12 directly to the interrupt pin 16A of the controller 16.

<Second Embodiment>

Figure 10:
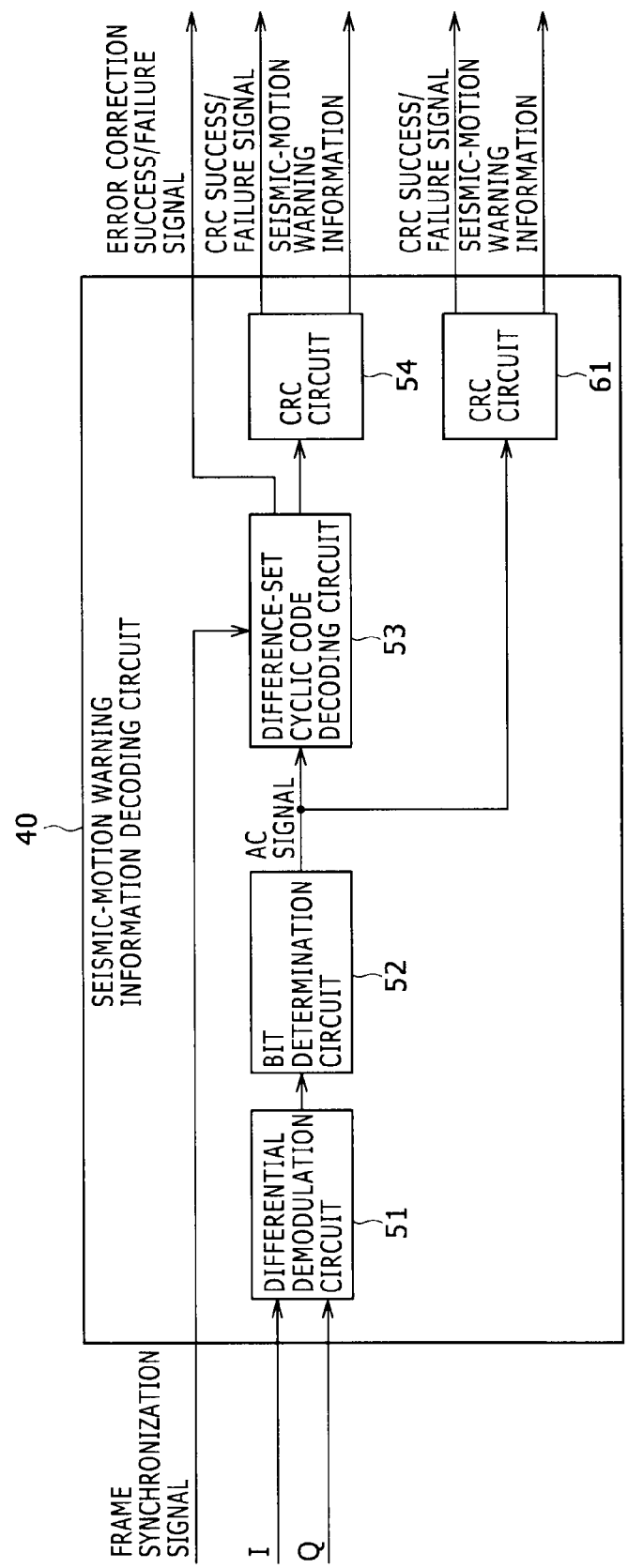
FIG. 10 is a block diagram showing another configuration example of the seismic-motion warning information decoding circuit in FIG. 4.

FIG. 10 is a block diagram showing another configuration example of the seismic-motion warning information decoding circuit 40 in FIG. 4.

Among the components shown in FIG. 10, the same components as those shown in FIG. 2 are given the same numerals. Overlapping description thereof is accordingly omitted.

The configuration of the seismic-motion warning information decoding circuit 40 shown in FIG. 10 is different from the configuration of FIG. 2 in that a CRC circuit 61 is provided besides the differential demodulation circuit 51, the bit determination circuit 52, the difference-set cyclic code decoding circuit 53, and the CRC circuit 54. An AC signal output from the synchronization/frame detection circuit 38 in FIG. 4 is input to the differential demodulation circuit 51 and a frame synchronization signal is input to the difference-set cyclic code decoding circuit 53.

The differential demodulation circuit 51 in FIG. 10 performs differential demodulation for the input AC signal to generate a complex signal having the signal point corresponding to the original information bit. The signal resulting from the differential demodulation by the differential demodulation circuit 51 is supplied to the bit determination circuit 52.

The bit determination circuit 52 makes a bit determination based on the signal resulting from the differential demodulation. The respective bits of the AC signal turned to a bit stream as the result of the bit determination are supplied to the difference-set cyclic code decoding circuit 53 and the CRC circuit 61 sequentially from the beginning bit one bit by one bit.

The difference-set cyclic code decoding circuit 53 detects the beginning of the frame of the AC signal based on the input frame synchronization signal. After receiving the bits up to the 204-th bit of the AC signal, the difference-set cyclic code decoding circuit 53 performs error correction by a difference-set cyclic code included in the seismic-motion warning information as the 82-bit parity bit, and outputs the seismic-motion warning information for which the error correction has been performed to the CRC circuit 54.

The CRC circuit 54 performs a CRC by the 10-bit CRC code included in the seismic-motion warning information supplied from the difference-set cyclic code decoding circuit 53, and outputs a CRC success/failure signal indicating the success and failure of the CRC and the seismic-motion warning information.

The CRC circuit 61 sequentially receives information supplied from the bit determination circuit 52. The CRC circuit 61 does not receive all of the bits up to the 204-th bit, which is the last bit configuring the AC signal, but performs a CRC by the CRC code at the timing of the completion of reception of the bits up to the 122-nd bit, i.e. the last of the CRC code. For the reception of the CRC code, the frame synchronization signal supplied from the synchronization/frame detection circuit 38 in FIG. 4 is accordingly used.

Figure 1:
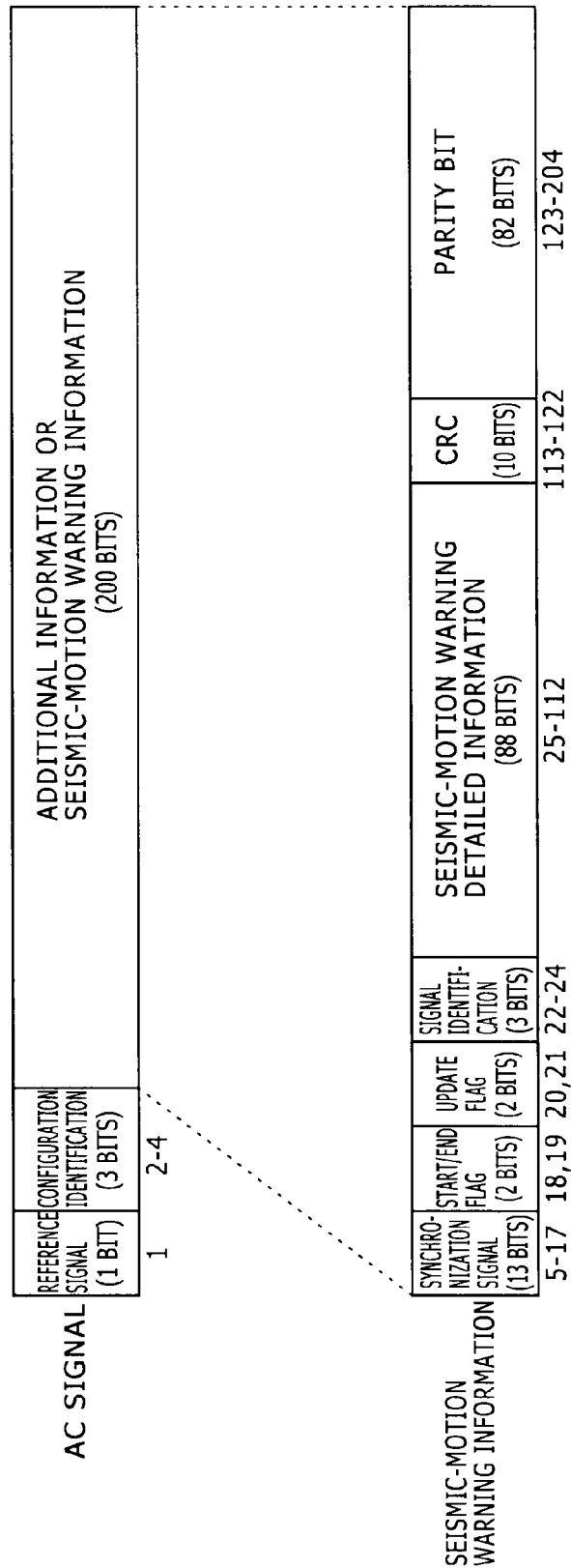
FIG. 1 is a diagram showing the frame configuration of an AC signal.

As described with reference to FIG. 1, the 10-bit CRC code of the AC signal is transmitted earlier than the 82-bit parity bit, and therefore it is possible to perform a CRC at the timing of the completion of reception of the 10-bit CRC code.

The CRC circuit 61 outputs a CRC success/failure signal indicating the success and failure of the CRC and the seismic-motion warning information. If the time taken for the CRC by the CRC circuit 54 is the same as the time taken for the CRC by the CRC circuit 61, the seismic-motion warning information is output from the CRC circuit 61 before output from the CRC circuit 54.

The seismic-motion warning information output from the CRC circuit 54 and the seismic-motion warning information output from the CRC circuit 61 are written to the register 12A and read out by the controller 16.

Alternatively, the seismic-motion warning information output from the CRC circuit 54 and the seismic-motion warning information output from the CRC circuit 61 may be input directly to the interrupt pin 16A of the controller 16 as described with reference to FIG. 9.

As just described, in the seismic-motion warning information decoding circuit 40 of FIG. 10, if the CRC succeeds, seismic-motion warning information is output from the CRC circuit 61 without error correction by a difference-set cyclic code. This makes it possible to transmit the seismic-motion warning information to the controller 16 more rapidly compared with the case in which seismic-motion warning information is output after the AC signal is received up to the last and error correction by a difference-set cyclic code is performed.

Although two CRC circuits, i.e. the CRC circuit 54 and the CRC circuit 61, are provided in FIG. 10, one CRC circuit that realizes the functions of the CRC circuit 54 and the CRC circuit 61 may be provided.

This one CRC circuit performs a CRC at the timing of reception of the CRC code and outputs a CRC success/failure signal and seismic-motion warning information. In addition, it performs a CRC also at the timing of supply of the seismic-motion warning information from the difference-set cyclic code decoding circuit 53 and outputs a CRC success/failure signal and the seismic-motion warning information.

With reference to a flowchart of FIG. 11, the processing by the receiver 12 having the seismic-motion warning information decoding circuit 40 of FIG. 10 will be described below.

Figure 11:
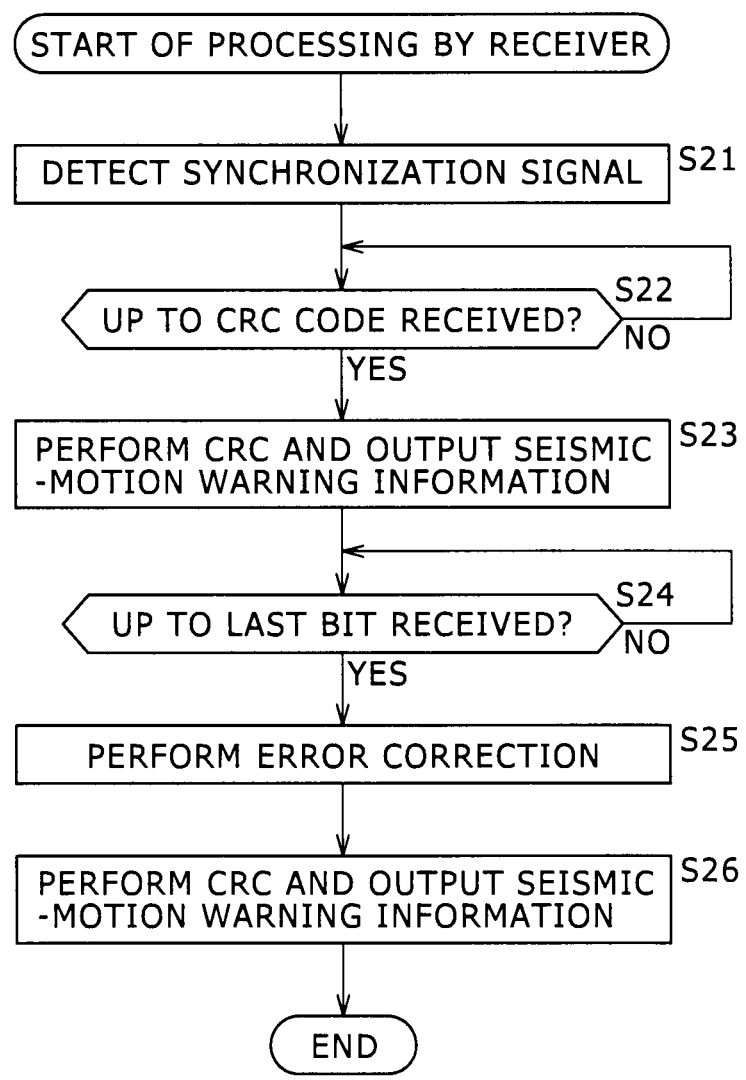
FIG. 11 is a flowchart for explaining processing by a receiver having the seismic-motion warning information decoding circuit of FIG. 10.

The processing of FIG. 11 is also started when an AC signal is supplied from the FFT operation circuit 35 to the synchronization/frame detection circuit 38 for example.

In a step S21, the synchronization/frame detection circuit 38 extracts the AC signal from a predetermined subcarrier of the signal demodulated by the FFT operation circuit 35, and detects the synchronization signal of the AC signal to detect the boundary of the OFDM frame. The synchronization/frame detection circuit 38 outputs, to the seismic-motion warning information decoding circuit 40, a frame synchronization signal indicating the position of the detected boundary of the OFDM frame together with the AC signal.

The frame synchronization signal output from the synchronization/frame detection circuit 38 is supplied to the difference-set cyclic code decoding circuit 53 in the seismic-motion warning information decoding circuit 40. Furthermore, for the AC signal output from the synchronization/frame detection circuit 38, differential demodulation is performed in the differential demodulation circuit 51 and a bit determination is made in the bit determination circuit 52. The respective bits that are output from the bit determination circuit 52 and configure the AC signal are supplied to the difference-set cyclic code decoding circuit 53 and the CRC circuit 61 sequentially from the beginning bit one bit by one bit.

In a step S22, the CRC circuit 61 determines whether or not the bits up to the CRC code have been received and waits until determining that the bits up to the CRC code have been received.

If it is determined in the step S22 that the bits up to the CRC code have been received, in a step S23, the CRC circuit 61 performs a CRC by the CRC code and outputs a CRC success/failure signal and seismic-motion warning information. When the CRC code is received by the CRC circuit 61, the bits up to the CRC code are received also by the difference-set cyclic code decoding circuit 53.

In a step S24, the difference-set cyclic code decoding circuit 53 determines whether or not the bits up to the 204-th bit as the last of the AC signal have been received and waits until determining that the bits up to the 204-th bit have been received.

If it is determined in the step S24 that the bits up to the 204-th bit as the last of the AC signal have been received, in a step S25, the difference-set cyclic code decoding circuit 53 performs error correction by a difference-set cyclic code. The difference-set cyclic code decoding circuit 53 outputs an error correction success/failure signal to the external and outputs the seismic-motion warning information for which the error correction has been performed to the CRC circuit 54.

In a step S26, the CRC circuit 54 performs a CRC by the CRC code included in the seismic-motion warning information supplied from the difference-set cyclic code decoding circuit 53 and outputs a CRC success/failure signal and the seismic-motion warning information. Thereafter, the processing is ended.

The above-described processing makes it possible to rapidly transmit seismic-motion warning information to the controller 16.

<Third Embodiment>

Figure 12:
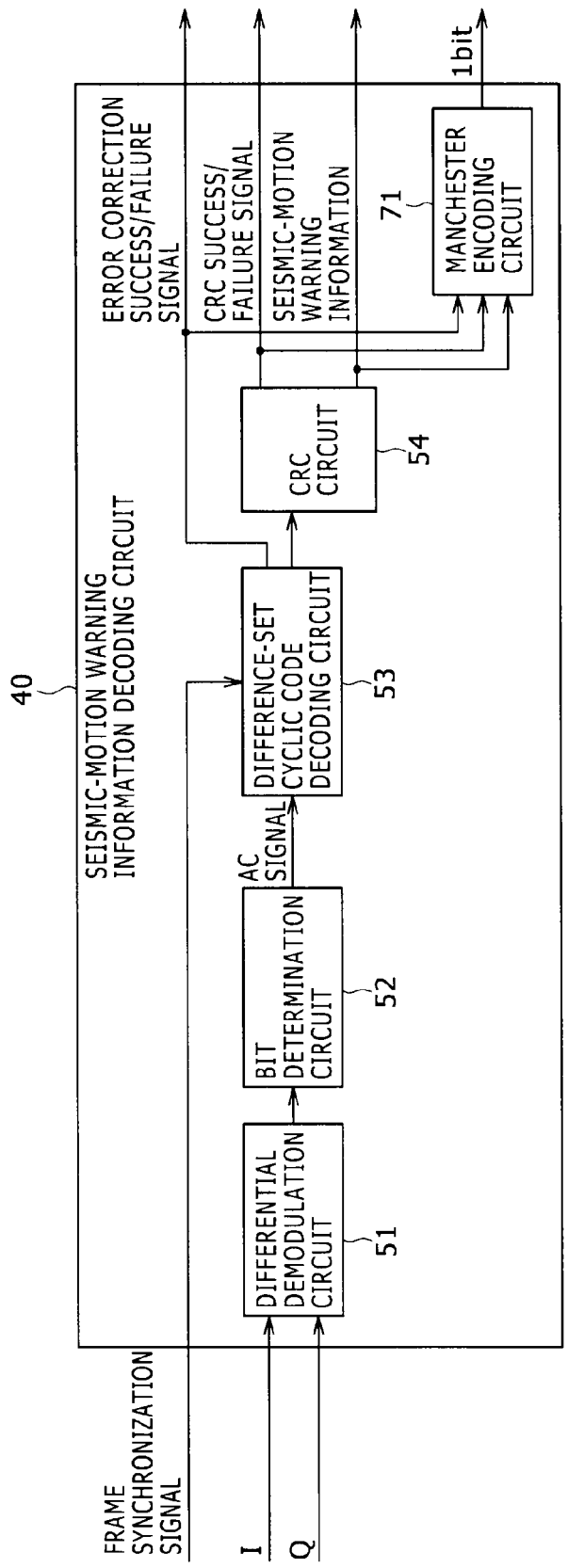
FIG. 12 is a block diagram showing further another configuration example of the seismic-motion warning information decoding circuit in FIG. 4.

FIG. 12 is a block diagram showing further another configuration example of the seismic-motion warning information decoding circuit 40 in FIG. 4.

Among the components shown in FIG. 12, the same components as those shown in FIG. 2 are given the same numerals. Overlapping description thereof is accordingly omitted.

The configuration of the seismic-motion warning information decoding circuit 40 shown in FIG. 12 is different from the configuration of FIG. 2 in that a Manchester encoding circuit 71 is provided besides the differential demodulation circuit 51, the bit determination circuit 52, the difference-set cyclic code decoding circuit 53, and the CRC circuit 54. An AC signal output from the synchronization/frame detection circuit 38 in FIG. 4 is input to the differential demodulation circuit 51 and a frame synchronization signal is input to the difference-set cyclic code decoding circuit 53.

The differential demodulation circuit 51 performs differential demodulation for the input AC signal to generate a complex signal having the signal point corresponding to the original information bit. The signal resulting from the differential demodulation by the differential demodulation circuit 51 is supplied to the bit determination circuit 52.

The bit determination circuit 52 makes a bit determination based on the signal resulting from the differential demodulation. The respective bits configuring the AC signal turned to a bit stream as the result of the bit determination are supplied to the difference-set cyclic code decoding circuit 53 sequentially from the beginning bit one bit by one bit.

The difference-set cyclic code decoding circuit 53 detects the beginning of the frame of the AC signal based on the input frame synchronization signal. After receiving the bits up to the 204-th bit of the AC signal, the difference-set cyclic code decoding circuit 53 performs error correction by a difference-set cyclic code included in the seismic-motion warning information as the 82-bit parity bit, and outputs the seismic-motion warning information for which the error correction has been performed to the CRC circuit 54.

Furthermore, the difference-set cyclic code decoding circuit 53 outputs an error correction success/failure signal. The error correction success/failure signal output from the difference-set cyclic code decoding circuit 53 is supplied to the external of the seismic-motion warning information decoding circuit 40 and supplied to the Manchester encoding circuit 71.

The CRC circuit 54 performs a CRC by the 10-bit CRC code included in the seismic-motion warning information supplied from the difference-set cyclic code decoding circuit 53, and outputs a CRC success/failure signal indicating the success and failure of the CRC and the seismic-motion warning information. The CRC success/failure signal and the seismic-motion warning information output from the CRC circuit 54 are supplied to the external of the seismic-motion warning information decoding circuit 40 and supplied to the Manchester encoding circuit 71.

If the Manchester encoding circuit 71 detects success in the error correction by the difference-set cyclic code decoding circuit 53 and success in the CRC by the CRC circuit 54, it performs Manchester encoding of part or all of the seismic-motion warning information supplied from the CRC circuit 54. Whether or not the error correction by the difference-set cyclic code decoding circuit 53 has succeeded is determined based on the error correction success/failure signal, and whether or not the CRC by the CRC circuit 54 has succeeded is determined based on the CRC success/failure signal.

The Manchester encoding circuit 71 adds a preamble composed of a predetermined number of bits, such as "00001," to the beginning of the seismic-motion warning information resulting from the Manchester encoding, and outputs the resulting seismic-motion warning information.

The seismic-motion warning information output from the Manchester encoding circuit 71 is input to the interrupt pin 16A of the controller 16. Specifically, the receiver 12 having the seismic-motion warning information decoding circuit 40 shown in FIG. 12 is realized by an LSI having the pin 12B connected to the interrupt pin 16A of the controller 16 as described with reference to FIG. 9.

In the controller 16 that has received the seismic-motion warning information output from the Manchester encoding circuit 71, processing for notifying information relating to the earthquake to the user is executed.

As described above, if seismic-motion warning information is supplied to the controller 16 via the I2C register, delay occurs in some cases depending on the timing of the polling. By allowing seismic-motion warning information itself to be output from the pin 12B of the LSI (receiver 12) connected to the interrupt pin 16A of the controller 16, the delay due to the polling can be avoided and the seismic-motion warning information can be rapidly transmitted to the controller 16.

Because of e.g. the necessity to ensure pins for supplying image data and audio data to the MPEG decoder 13, it is impossible to assign many pins as the pins for transmitting seismic-motion warning information among the pins mounted on the LSI to realize the receiver 12.

By performing Manchester encoding of seismic-motion warning information and outputting the resulting seismic-motion warning information one bit by one bit, the seismic-motion warning information can be transmitted to the controller 16 by using one pin. By the Manchester encoding, the signal level changes from the high level to the low level or from the low level to the high level every one-bit cycle, and thus ensuring of synchronization is facilitated also in the controller 16.

In the case of utilizing Manchester encoding, if 0 is consecutive or 1 is consecutive, the shift of the code by 1 bit causes a 1-consecutive signal to be regarded as a 0-consecutive signal and causes a 0-consecutive signal to be regarded as a 1-consecutive signal. Outputting seismic-motion warning information to which a preamble is added enables the controller 16 to easily detect the start position of the seismic-motion warning information.

Instead of the Manchester code, the non-return-to-zero (NRZ) code, the differential Manchester code, the return-to-zero (RZ) code, the bipolar code, or another code may be used.

With reference to a flowchart of FIG. 13, the processing by the receiver 12 having the seismic-motion warning information decoding circuit 40 of FIG. 12 will be described below.

Figure 13:
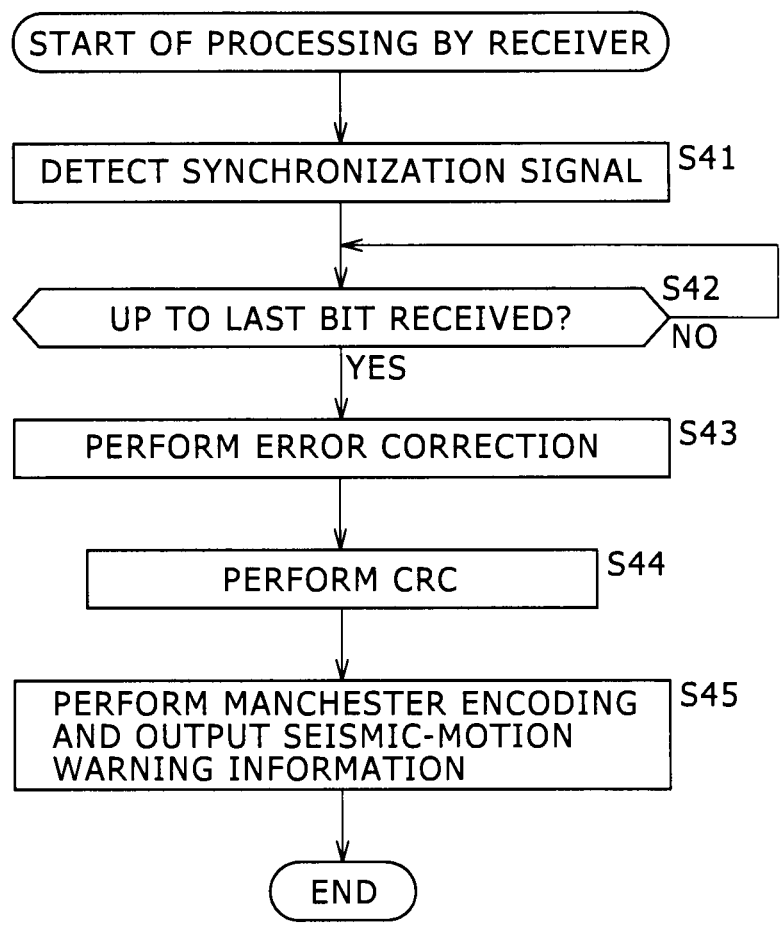
FIG. 13 is a flowchart for explaining processing by a receiver having the seismic-motion warning information decoding circuit of FIG. 12.

The processing of FIG. 13 is also started when an AC signal is supplied from the FFT operation circuit 35 to the synchronization/frame detection circuit 38 for example.

In a step S41, the synchronization/frame detection circuit 38 extracts the AC signal from a predetermined subcarrier of the signal demodulated by the FFT operation circuit 35, and detects the synchronization signal of the AC signal to detect the boundary of the OFDM frame. The synchronization/frame detection circuit 38 outputs, to the seismic-motion warning information decoding circuit 40, a frame synchronization signal indicating the position of the detected boundary of the OFDM frame together with the AC signal.

The frame synchronization signal output from the synchronization/frame detection circuit 38 is supplied to the difference-set cyclic code decoding circuit 53 in the seismic-motion warning information decoding circuit 40. Furthermore, for the AC signal output from the synchronization/frame detection circuit 38, differential demodulation is performed in the differential demodulation circuit 51 and a bit determination is made in the bit determination circuit 52. The respective bits that are output from the bit determination circuit 52 and configure the AC signal are received by the difference-set cyclic code decoding circuit 53 sequentially from the beginning bit one bit by one bit.

In a step S42, the difference-set cyclic code decoding circuit 53 determines whether or not the bits up to the 204-th bit as the last of the AC signal have been received and waits until determining that the bits up to the 204-th bit have been received.

If it is determined in the step S42 that the bits up to the 204-th bit as the last of the AC signal have been received, in a step S43, the difference-set cyclic code decoding circuit 53 performs error correction by a difference-set cyclic code. The difference-set cyclic code decoding circuit 53 outputs an error correction success/failure signal and outputs the seismic-motion warning information for which the error correction has been performed to the CRC circuit 54.

In a step S44, the CRC circuit 54 performs a CRC by the CRC code included in the seismic-motion warning information supplied from the difference-set cyclic code decoding circuit 53 and outputs a CRC success/failure signal and the seismic-motion warning information.

In a step S45, if the Manchester encoding circuit 71 detects success in the error correction by the difference-set cyclic code decoding circuit 53 and the CRC by the CRC circuit 54, it performs Manchester encoding of the seismic-motion warning information supplied from the CRC circuit 54 and outputs the resulting seismic-motion warning information.

In the controller 16 that has received the seismic-motion warning information resulting from the Manchester encoding at the interrupt pin 16A, decoding processing is executed and processing for notifying information relating to the earthquake to the user is executed. Thereafter, the processing is ended.

The above-described processing makes it possible to avoid the occurrence of delay due to the polling and rapidly transmit seismic-motion warning information to the controller 16.

It is also possible to employ a configuration in which Manchester encoding is performed not for seismic-motion warning information itself but for the early detection flag described in the first embodiment and the early detection flag resulting from the Manchester encoding is supplied to the interrupt pin 16A of the controller 16.

In this case, the Manchester encoding circuit 71 is provided at the subsequent stage of the early detection flag generation circuit 55 in FIG. 5 and Manchester encoding is performed therein. It is also possible that a preamble composed of a predetermined number of bits is added to the early detection flag resulting from the Manchester encoding by the Manchester encoding circuit 71.

<Fourth Embodiment>

It is possible that the above-described determination as to whether or not seismic-motion warning information is transmitted and reception of seismic-motion warning information are carried out when the receiving device 1 is in the waiting state and reception of plural segments (3 segments or 13 segments) is not required.

When the receiving device 1 is in the waiting state, among 13 segments prescribed by the ISDB-T standard, only one segment No. 0, which is at the center when the segments are arranged on the frequency axis, is selected by the receiver 12. Based on the signal of the AC carrier of one segment No. 0, determination as to whether or not seismic-motion warning information is transmitted and reception of seismic-motion warning information are carried out.

Figure 14:
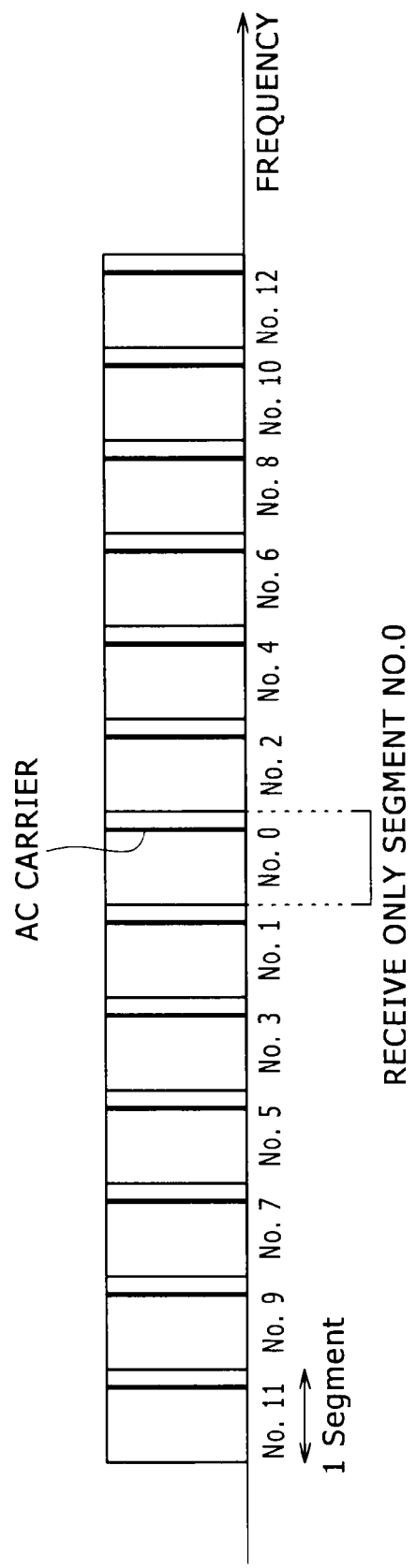
FIG. 14 is a diagram showing segments included in one physical channel.

FIG. 14 is a diagram showing the segments that are prescribed by the ISDB-T standard and included in one physical channel.

In the ISDB-T standard, the frequency band (6 MHz) of one physical channel is divided into 13 segments. The AC carrier is set in each segment as shown by the heavy line in each segment in FIG. 14. Seismic-motion warning information is transmitted by using the AC carrier of segment No. 0.

Therefore, even by reception of only segment No. 0, the above-described determination as to whether or not seismic-motion warning information is transmitted and reception of seismic-motion warning information can be carried out.

This makes it possible to suppress the power consumption of the receiving device 1 compared with the case of receiving the whole of 13 segments in order to carry out determination as to whether or not seismic-motion warning information is transmitted and reception of seismic-motion warning information. Although 12 segments besides segment No. 0 need to be received in the case of receiving a high-resolution digital television program, the segments other than segment No. 0 do not need to be received in the waiting state, in which screen displaying is not performed.

Three bits of the configuration identification of the AC signal are transmitted at the same timing as that of the TMCC signal also in the AC carrier of the other segments. Also when only segment No. 0 is received, a modulation system robust against noise, such as DQPSK modulation, is used as the modulation system for the bits of the configuration identification. In addition, the bits of the same configuration identification are transmitted by plural AC carriers. Thus, sufficient reception performance can be achieved.

The receiving device 1 is switched to the state of receiving the whole of 13 segments at the timing when the early detection flag generated by the receiver 12 is received by the controller 16 or at the timing when seismic-motion warning information decoded by the receiver 12 is received by the controller 16.

Figure 15:
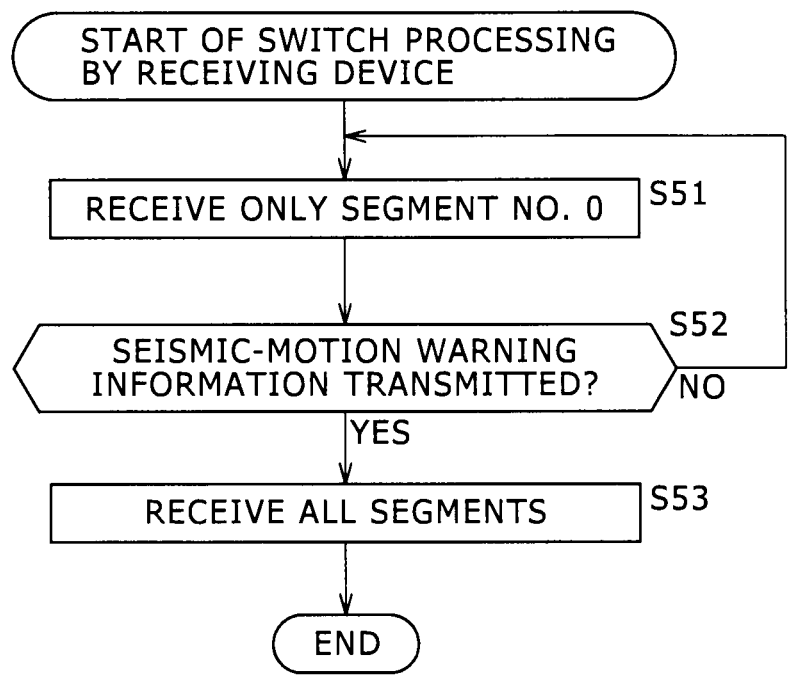
FIG. 15 is a flowchart for explaining switch processing by the receiving device.

With reference to a flowchart of FIG. 15, the processing of switching the reception state by the receiving device 1 will be described below.

This processing is started when the receiving device 1 is in the waiting state for example.

In a step S51, the receiver 12 receives only segment No. 0. Based on the signal transmitted by the AC carrier of segment No. 0, determination as to whether or not seismic-motion warning information is transmitted and reception of seismic-motion warning information are carried out. That is, in the receiver 12, the processing described with reference to FIG. 7, FIG. 11, or FIG. 13 is executed.

In a step S52, the controller 16 determines whether or not seismic-motion warning information is transmitted. For example, the controller 16 determines that seismic-motion warning information is transmitted when receiving the early detection flag generated by the receiver 12 or when receiving seismic-motion warning information decoded by the receiver 12.

If it is determined in the step S52 that seismic-motion warning information is not transmitted, the processing returns to the step S51, so that the reception of only segment No. 0 is continued.

On the other hand, if it is determined in the step S52 that seismic-motion warning information is transmitted, in a step S53, the receiver 12 receives the whole of 13 segments in accordance with control by the controller 16.

The state of the receiving device 1 is switched from the waiting state to the on-state, and the respective units such as the display unit 15 and the speaker 17 are also activated. After the activation of the respective units, images of a television program are displayed on the display unit 15 and sound is output from the speaker 17 based on information transmitted by the carriers of the segments other than segment No. 0.

In this manner, the state is switched from the waiting state to the on-state in response to transmission of seismic-motion warning information and screen displaying and so forth is automatically performed. This can invite user's attention. Furthermore, information relating to the earthquake can be displayed in such a manner as to be superimposed on images of a television program.

<Modification Example>

The above description relates to transmission of seismic-motion warning information by use of the AC signal. However, similar processing may be executed in the case in which warning information other than seismic-motion warning information is transmitted by a transmission signal having a predetermined frame configuration. In the warning information, e.g. information relating to the weather such as a typhoon and information relating to a seismic sea wave are included.

Thereby, the advent of the transmitted warning information can be detected before reception of the transmission signal having the predetermined frame configuration up to the last, and the advent of the warning information can be rapidly transmitted to the controller 16.

Figure 16:
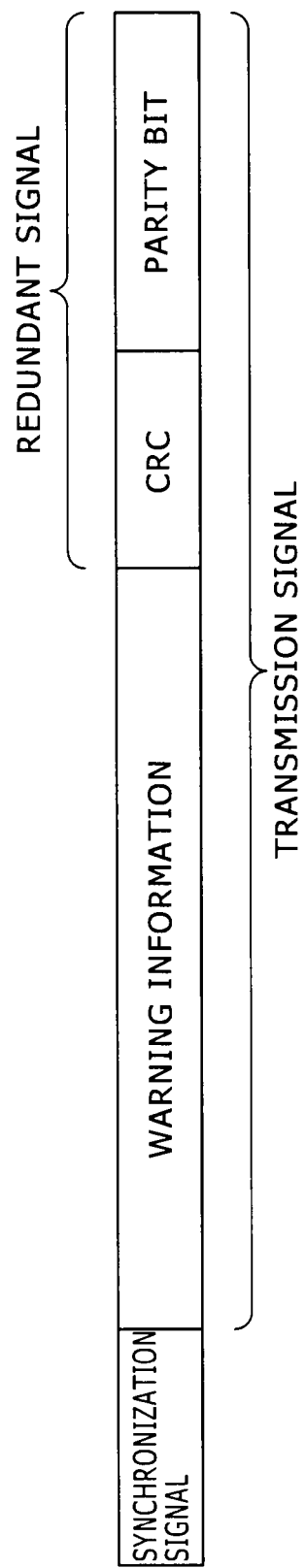
FIG. 16 is a diagram showing an example of the frame configuration.

FIG. 16 is a diagram showing an example of the frame configuration of the transmission signal to transmit warning information.

In the example of FIG. 16, a synchronization signal is added to the beginning of the transmission signal. Furthermore, in the transmission signal, warning information and a redundant signal are included in the transmission order. The redundant signal is composed of a CRC code and a parity bit.

A description will be made in association with the AC signal to transmit seismic-motion warning information. The synchronization signal in FIG. 16 corresponds to the synchronization signal of the AC signal, detected by the synchronization/frame detection circuit 38. The warning information in FIG. 16 corresponds to the bits from the beginning of the AC signal to the 112-th bit. The CRC code in FIG. 16 corresponds to the 10-bit CRC code included in the seismic-motion warning information. The parity bit in FIG. 16 corresponds to the 82-bit parity bit included in the seismic-motion warning information.

For example, whether or not warning information is transmitted is determined at the timing of the completion of reception of bits up to a predetermined bit of warning information, and a flag indicating that warning information is transmitted is supplied from the receiver 12 to the controller 16 before reception of the bits up to the last of the parity bit.

This enables the controller 16 to rapidly detect the advent of transmitted warning information and start predetermined processing such as processing for notifying the advent of the warning information to the user.

It is also possible to employ a configuration in which a CRC is performed at the timing of the completion of reception of the bits up to the last bit of the CRC code before reception of the parity bit and at least part of warning information is supplied from the receiver 12 to the controller 16 before error correction by the parity bit is performed.

[Examples of Application to Receiving System]

Figure 17:
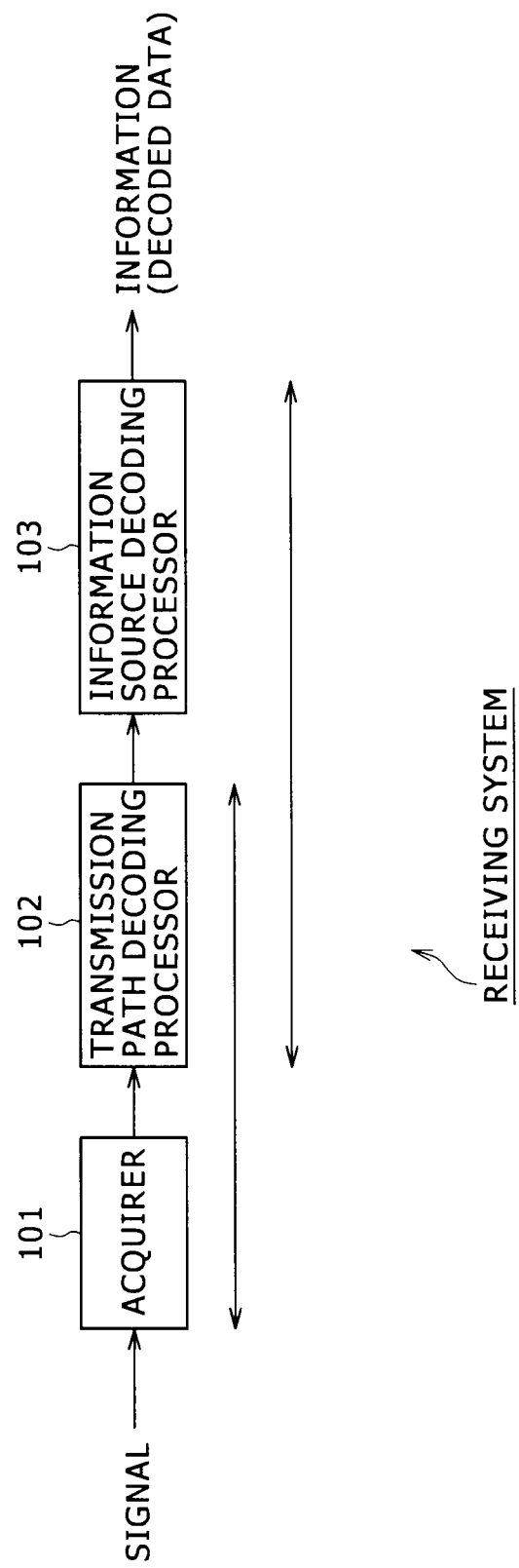
FIG. 17 is a block diagram showing a configuration example of a first mode of a receiving system to which the receiver is applied.

FIG. 17 is a block diagram showing a configuration example of a first mode of a receiving system to which the receiver 12 is applied.

The receiving system of FIG. 17 is composed of an acquirer 101, a transmission path decoding processor 102, and an information source decoding processor 103.

The acquirer 101 acquires a signal via a transmission path (not shown) such as digital terrestrial broadcasting, digital satellite broadcasting, a CATV network, the Internet, or another network, and supplies the signal to the transmission path decoding processor 102. The receiver 12 of FIG. 4 is included in the acquirer 101 for example.

The transmission path decoding processor 102 executes transmission path decoding processing including error correction for the signal acquired by the acquirer 101 via the transmission path, and supplies the resulting signal to the information source decoding processor 103.

For the signal for which the transmission path decoding processing has been executed, the information source decoding processor 103 executes information source decoding processing including processing of expanding compressed information to the original information to acquire the transmission-subject data.

Specifically, the signal acquired by the acquirer 101 via the transmission path is often made through compression encoding to compress information in order to decrease the amount of data of images, sound, and so forth. In this case, the information source decoding processor 103 executes the information source decoding processing such as processing of expanding the compressed information to the original information for the signal for which the transmission path decoding processing has been executed.

If compression encoding is not performed for the signal acquired by the acquirer 101 via the transmission path, the processing of expanding compressed information to the original information is not executed in the information source decoding processor 103. Examples of the expansion processing include MPEG decoding. Furthermore, besides the expansion processing, descramble and so forth is often included in the information source decoding processing.

The receiving system of FIG. 17 can be applied to e.g. a television tuner to receive digital television broadcasting. Each of the acquirer 101, the transmission path decoding processor 102, and the information source decoding processor 103 can be configured as one independent device (hardware (integrated circuit (IC) or the like), or software module).

Alternatively, for the acquirer 101, the transmission path decoding processor 102, and the information source decoding processor 103, one set of these three units can be configured as one independent device. It is also possible that the set of the acquirer 101 and the transmission path decoding processor 102 is configured as one independent device, and it is also possible that the set of the transmission path decoding processor 102 and the information source decoding processor 103 is configured as one independent device.

Figure 18:
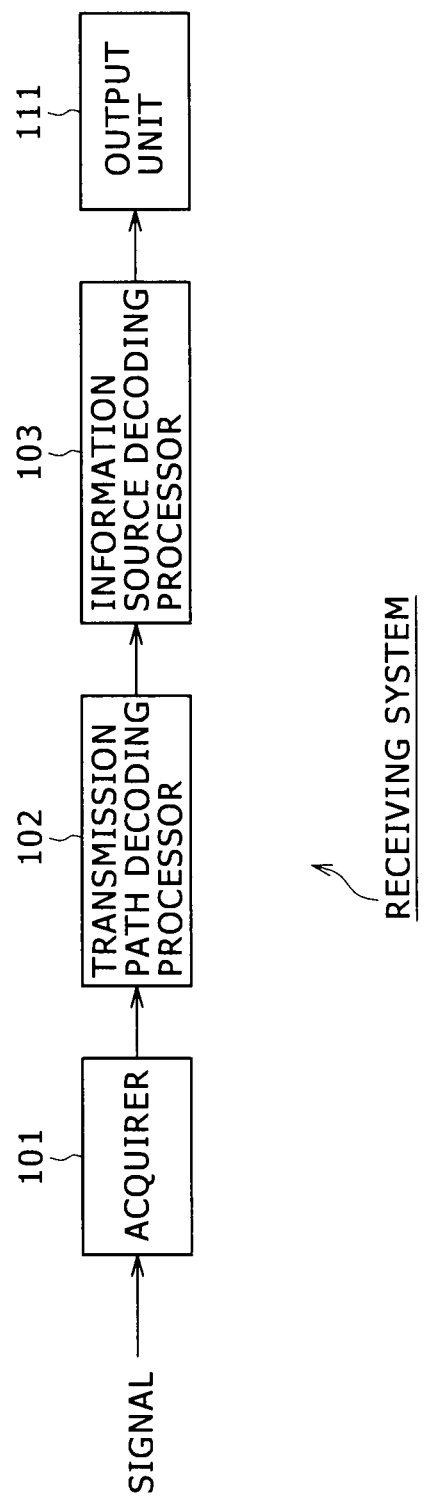
FIG. 18 is a block diagram showing a configuration example of a second mode of the receiving system to which the receiver is applied.

FIG. 18 is a block diagram showing a configuration example of a second mode of the receiving system to which the receiver 12 is applied.

Among the components shown in FIG. 18, the components corresponding to those shown in FIG. 17 are given the same numerals. Description thereof is accordingly omitted.

The configuration of the receiving system of FIG. 18 is in common with the configuration of FIG. 17 in that it has the acquirer 101, the transmission path decoding processor 102, and the information source decoding processor 103, but is different from the configuration of FIG. 17 in that an output unit 111 is newly provided.

The output unit 111 is e.g. a display device to display images or a speaker to output sound, and outputs an image, sound, or the like as the signal output from the information source decoding processor 103. That is, the output unit 111 displays an image or outputs sound.

The receiving system of FIG. 18 can be applied to e.g. a TV to receive television broadcasting as digital broadcasting and a radio receiver to receive radio broadcasting.

If compression encoding is not performed for the signal acquired by the acquirer 101, the signal output by the transmission path decoding processor 102 is supplied directly to the output unit 111.

FIG. 19 is a block diagram showing a configuration example of a third mode of the receiving system to which the receiver 12 is applied.

Among the components shown in FIG. 19, the components corresponding to those shown in FIG. 17 are given the same numerals. Description thereof is accordingly omitted.

The configuration of the receiving system of FIG. 19 is in common with the configuration of FIG. 17 in that it has the acquirer 101 and the transmission path decoding processor 102, but is different from the configuration of FIG. 17 in that the information source decoding processor 103 is not provided and a recorder 121 is newly provided.

The recorder 121 records (stores) the signal (e.g. TS packet of an MPEG TS) output by the transmission path decoding processor 102 in a recording (storage) medium such as an optical disc, a hard disc (magnetic disc), or a flash memory.

The above-described receiving system of FIG. 19 can be applied to e.g. recorder apparatus to record television broadcasting.

It is also possible to employ a configuration in which the information source decoding processor 103 is provided and the recorder 121 records a signal resulting from information source decoding processing by the information source decoding processor 103, i.e. images and sound obtained by decoding.

The above-described series of processing can be executed by hardware or can be executed also by software. In the case of executing the series of processing by software, a program configuring the software is installed from a program recording medium to e.g. a computer incorporated in dedicated hardware or a general-purpose personal computer.

FIG. 20 is a block diagram showing a configuration example of the hardware of a computer that executes the above-described series of processing by a program.

A central processing unit (CPU) 151, a read only memory (ROM) 152, and a random access memory (RAM) 153 are connected to each other by a bus 154.

Furthermore, an input/output interface 155 is connected to the bus 154. To the input/output interface 155, an input unit 156 made up of a keyboard, a mouse, etc. and an output unit 157 made up of a display, a speaker, etc. are connected. Furthermore, to the input/output interface 155, a storage unit 158 formed of a hard disc, a non-volatile memory, or the like, a communication unit 159 formed of a network interface and so forth, a drive 160 for driving a removable medium 161 are connected.

In the computer having the above-described configuration, for example the CPU 151 loads, into the RAM 153, a program stored in the storage unit 158 via the input/output interface 155 and the bus 154, and executes the program. Thereby, the above-described series of processing is executed.

For example, the program to be executed by the CPU 151 is recorded in the removable medium 161 or offered via a wired or wireless transmission medium such as a local area network, the Internet, or digital broadcasting, so as to be installed in the storage unit 158.

The program executed by the computer may be a program processed in a time-series manner along the order described in the present specification, or may be a program processed in parallel or at the necessary timing such as when a call is made.

Embodiments of the present invention are not limited to the above-described embodiments, but various changes can be made without departing from the gist of the present invention.

The present application contains subject matter related to that disclosed in Japanese Priority Patent Application JP 2010-032126 filed in the Japan Patent Office on Feb. 17, 2010, the entire content of which is hereby incorporated by reference.

What is claimed is:

1. A receiving device, comprising:
a receiver configured to receive only a partial segment among a plurality of segments obtained by dividing a frequency band of one physical channel when the receiving device is in a waiting state, and returning from the waiting state to an activated state when warning information is transmitted, if transmission of the warning information by the partial segment is possible, the warning information being seismic-motion warning information transmitted by an auxiliary channel (AC) signal prescribed by an integrated services digital broadcasting-terrestrial (ISDB-T) standard; and
a controller configured to start processing for outputting a warning in response a determination by the receiver that the seismic-motion warning information is transmitted and a detection flag indicating that the seismic-motion warning information is transmitted or at least part of the seismic-motion warning information is output from the receiver, wherein
the receiver outputs the detection flag or the at least part of the warning information from a pin of a first semiconductor chip on which the receiver is mounted to a pin of a second semiconductor chip on which the controller is mounted, and
the controller starts processing for outputting warning if the detection flag or the at least part of the warning information is input to the pin of the second semiconductor chip.

2. The receiving device according to claim 1, wherein the partial segment is segment No. 0 prescribed by the ISDB-T standard, and
the receiver starts reception of whole of 13 segments when the warning information is transmitted.

3. The receiving device according to claim 1, wherein
the receiver determines whether or not the seismic-motion warning information is transmitted at a timing of completion of reception of bits from a second bit of the AC signal to a fourth bit, and, if the received 3 bits are 001 or 110, the receiver determines that the seismic-motion warning information is transmitted and outputs the detection flag indicating that the seismic-motion warning information is transmitted.

4. The receiving device according to claim 1, wherein the receiver determines whether or not the seismic-motion warning information is transmitted at a timing of completion of reception of bits from a second bit of the AC signal to a predetermined bit of a synchronization signal of the seismic-motion warning information, represented by a bit sequence from a fifth bit to a 17-th bit, and, if 3 bits from the second bit to a fourth bit are 001 or 110, the receiver determines that the seismic-motion warning information is transmitted and outputs the detection flag indicating that the seismic-motion warning information is transmitted when part of the bit sequence representing the synchronization signal corresponds with part of a known bit sequence or when all of the bit sequence representing the synchronization signal corresponds with all of a known bit sequence.

5. The receiving device according to claim 1, wherein the receiver determines whether or not the seismic-motion warning information is transmitted at a timing of completion of reception of bits from a second bit of the AC signal to an 18-th bit or a 19-th bit, and, if 3 bits from the second bit to a fourth bit are 001 or 110, the receiver determines that the seismic-motion warning information is transmitted and outputs the detection flag indicating that the seismic-motion warning information is transmitted when one bit as the 18-th bit is 0 or when two bits as the 18-th bit and the 19-th bit are 00.

6. The receiving device according to claim 5, wherein the receiver further receives a 20-th bit of the AC signal or the 20-th bit and a 21-st bit.

7. The receiving device according to claim 1, wherein the receiver determines whether or not the seismic-motion warning information is transmitted at a timing of completion of reception of bits from a second bit of the AC signal to a 24-th bit, and, if 3 bits from the second bit to a fourth bit are 001 or 110, the receiver determines that the seismic-motion warning information is transmitted and outputs the detection flag indicating that the seismic-motion warning information is transmitted when 3 bits from a 22-nd bit to the 24-th bit are 000.

8. The receiving device according to claim 1, wherein the receiver detects an error in bits of the seismic-motion warning information by using a CRC code from a 113-th bit of the AC signal to a 122-nd bit at a timing of completion of reception of the CRC code, and outputs the seismic-motion warning information if no error is detected.

9. The receiving device according to claim 1, wherein the receiver stores the detection flag or the at least part of the warning information in a register in the first semiconductor chip on which the receiver is mounted, and the controller is mounted on the second semiconductor chip different from the first semiconductor chip and checks information stored in the register at a predetermined cycle, and, if the controller confirms that the detection flag or the at least part of the warning information is stored in the register, the controller starts processing for outputting warning.

10. The receiving device according to claim 1, wherein the receiver encodes the detection flag or the at least part of the warning information by a predetermined encoding system, and outputs information resulting from the encoding from the pin of the first semiconductor chip after addition of a preamble composed of a predetermined number of bits.

11. A receiving method, comprising:
receiving, by a receiver, only a partial segment among a plurality of segments obtained by dividing a frequency band of one physical channel when a device is in a waiting state, and returning from the waiting state to an activated state when warning information is transmitted, if transmission of the warning information by the partial segment is possible, the warning information being seismic-motion warning information transmitted by an auxiliary channel (AC) signal prescribed by an integrated services digital broadcasting-terrestrial (ISDB-T) standard;

starting, by a controller, processing for outputting a warning in response a determination by the receiver that the seismic-motion warning information is transmitted and a detection flag indicating that the seismic-motion warning information is transmitted or at least part of the seismic-motion warning information is output from the receiver;

outputting, by the receiver, the detection flag or the at least part of the warning information from a pin of a first semiconductor chip on which the receiver is mounted to a pin of a second semiconductor chip on which the controller is mounted; and starting, by the controller, processing for outputting warning if the detection flag or the at least part of the warning information is input to the pin of the second semiconductor chip.

12. A non-transitory computer-readable medium including a program, which when executed by a computer, causes the computer to execute processing comprising:
receiving, by a receiver., only a partial segment among a plurality of segments obtained by dividing a frequency band of one physical channel when a device is in a waiting state, and returning from the waiting state to an activated state when warning information is transmitted, if transmission of the warning information by the partial segment is possible, the warning information being seismic-motion warning information transmitted by an auxiliary channel (AC) signal prescribed by an integrated services digital broadcasting-terrestrial (ISDB-T) standard;

starting, by a controller, processing for outputting a warning in response a determination by the receiver that the seismic-motion warning information is transmitted and a detection flag indicating that the seismic-motion warning information is transmitted or at least part of the seismic-motion warning information is output from the receiver;

outputting, by the receiver, the detection flag or the at least part of the warning information from a pin of a first semiconductor chip on which the receiver is mounted to a pin of a second semiconductor chip on which the controller is mounted; and starting, by the controller, processing for outputting warning if the detection flag or the at least part of the warning information is input to the pin of the second semiconductor chip.

13. A receiving device, comprising:
means for receiving only a partial segment among a plurality of segments obtained by dividing a frequency band of one physical channel when the receiving device is in a waiting state, and return from the waiting state to an activated state when warning information is transmitted, if transmission of the warning information by the partial segment is possible, the warning information being seismic-motion warning information transmitted by an auxiliary channel (AC) signal prescribed by an integrated services digital broadcasting-terrestrial (ISDB-T) standard; and means for starting processing for outputting a warning in response a determination by the means for receiving that the seismic-motion warning information is transmitted and a detection flag indicating that the seismic-motion warning information is transmitted or at least part of the seismic-motion warning information is output from the means for receiving, wherein the means for receiving outputs the detection flag or the at least part of the warning information from a pin of a first semiconductor chip on which the means for receiving is mounted to a pin of a second semiconductor chip on which the means for starting is mounted, and the means for starting starts processing for outputting warning if the detection flag or the at least part of the warning information is input to the pin of the second semiconductor chip.

* * * * *